US012561239B1

(12) United States Patent
Österlund et al.

(10) Patent No.: US 12,561,239 B1
(45) Date of Patent: Feb. 24, 2026

(54) TECHNIQUES FOR CONCURRENT MULTI-GENERATION GARBAGE COLLECTION

(71) Applicant: Oracle International Corporation, Redwood Shores, CA (US)

(72) Inventors: Erik Österlund, Vasterhaninge (SE); Axel Boldt-Christmas, Stockholm (SE); Stefan Mats Rikard Karlsson, Nacka (SE)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 19/021,870

(22) Filed: Jan. 15, 2025

(51) Int. Cl.
*G06F 12/02* (2006.01)

(52) U.S. Cl.
CPC ................................ *G06F 12/0253* (2013.01)

(58) Field of Classification Search
None
See application file for complete search history.

(56) References Cited

U.S. PATENT DOCUMENTS

| | | | |
|---|---|---|---|
| 5,765,007 A | 6/1998 | Rahman et al. | |
| 5,787,430 A | 7/1998 | Doeringer et al. | |
| 5,842,016 A | 11/1998 | Toutonghi et al. | |
| 5,845,298 A * | 12/1998 | O'Connor | G06F 12/0276 |
| | | | 711/E12.012 |
| 5,873,104 A | 2/1999 | Tremblay et al. | |
| 5,928,357 A | 7/1999 | Underwood et al. | |
| 5,933,840 A | 8/1999 | Menon et al. | |

(Continued)

FOREIGN PATENT DOCUMENTS

| | | |
|---|---|---|
| CA | 2700217 C | 7/2011 |
| JP | 4265610 B2 | 5/2009 |

(Continued)

OTHER PUBLICATIONS

Tene et al.; C4: The Continuously Concurrent Compacting Collector ISMM'11, Jun. 4-5, 2011, San Jose, CA, USA Copyright 2011, ACM 978-M503-0263-0/11/06 . . . $10.00.

(Continued)

*Primary Examiner* — Amresh Singh
(74) *Attorney, Agent, or Firm* — Invoke

(57) ABSTRACT

Techniques are disclosed for performing a garbage collection process that processes reference objects in multiple generations of a memory area while a program instance is concurrently manipulating runtime objects in the memory area. During one phase of concurrent operations, the system applies one rule set for processing reference objects in one generation of the memory area. During another phase of concurrent operations, the system applies another rule set for processing reference objects residing in another generation of the memory area. To enable the performance of the one phase of concurrent operations and the other phase of concurrent operations at the same time, the system tracks the accessibility of a given runtime object with respect to both of the one generation and the other generation. The system tracks the given runtime object's accessibility with respect to both generations by embedding metadata into a pointer that refers to the given runtime object.

20 Claims, 12 Drawing Sheets

(56)                References Cited

U.S. PATENT DOCUMENTS

| | | | |
|---|---|---|---|
| 6,052,699 A | 4/2000 | Huelsbergen et al. |
| 6,065,020 A | 5/2000 | Dussud |
| 6,158,024 A | 12/2000 | Mandal |
| 6,226,653 B1 | 5/2001 | Alpern et al. |
| 6,304,949 B1 | 10/2001 | Houlsdworth |
| 6,324,637 B1 | 11/2001 | Hamilton |
| 6,499,032 B1 | 12/2002 | Tikkanen et al. |
| 6,567,905 B2 | 5/2003 | Otis |
| 6,694,346 B1 | 2/2004 | Aman et al. |
| 6,728,732 B1 | 4/2004 | Eatherton et al. |
| 6,766,513 B2 | 7/2004 | Charnell et al. |
| 6,769,004 B2 | 7/2004 | Barrett |
| 6,809,792 B1 | 10/2004 | Tehranchi et al. |
| 6,915,296 B2 | 7/2005 | Parson |
| 7,072,905 B2 | 7/2006 | Garthwaite |
| 7,089,272 B1 | 8/2006 | Garthwaite et al. |
| 7,269,705 B1 | 9/2007 | Seidl et al. |
| 7,293,051 B1 | 11/2007 | Printezis et al. |
| 7,389,395 B1 | 6/2008 | Garthwaite et al. |
| 7,404,182 B1 | 7/2008 | Garthwaite et al. |
| 7,523,081 B1 | 4/2009 | Engebretsen |
| 7,539,837 B1 | 5/2009 | Flood et al. |
| 7,546,587 B2 | 6/2009 | Marr et al. |
| 7,548,940 B2 * | 6/2009 | Bacon ................. G06F 12/0253 |
| 7,610,437 B2 | 10/2009 | Sinclair et al. |
| 7,774,389 B2 | 8/2010 | Stephens et al. |
| 7,808,929 B2 | 10/2010 | Wong et al. |
| 7,904,493 B2 | 3/2011 | Schmelter et al. |
| 7,962,707 B2 | 6/2011 | Kaakani et al. |
| 7,984,084 B2 | 7/2011 | Sinclair |
| 8,051,426 B2 | 11/2011 | Meijer et al. |
| 8,161,084 B2 * | 4/2012 | Goetz ................. G06F 12/0253 |
| | | 707/813 |
| 8,205,203 B2 * | 6/2012 | Auerbach ........... G06F 12/0269 |
| | | 718/103 |
| 8,261,269 B2 | 9/2012 | Garmark |
| 8,285,918 B2 | 10/2012 | Maheshwari |
| 8,443,263 B2 | 5/2013 | Selinger et al. |
| 8,495,093 B2 | 7/2013 | Baudel |
| 8,688,754 B1 | 4/2014 | Burka et al. |
| 8,788,778 B1 | 7/2014 | Boyle |
| 8,825,719 B2 | 9/2014 | Steensgaard et al. |
| 8,825,721 B2 | 9/2014 | Hunt et al. |
| 8,856,186 B1 | 10/2014 | Li et al. |
| 8,873,284 B2 | 10/2014 | Sinclair et al. |
| 9,135,169 B2 | 9/2015 | Kawachiya et al. |
| 9,208,081 B1 | 12/2015 | Dice et al. |
| 9,223,693 B2 | 12/2015 | Sinclair et al. |
| 9,323,608 B2 | 4/2016 | Troia |
| 9,336,133 B2 | 5/2016 | Sinclair et al. |
| 9,348,746 B2 | 5/2016 | Sinclair et al. |
| 9,465,731 B2 | 10/2016 | Sinclair et al. |
| 9,503,435 B2 | 11/2016 | Mizrahi et al. |
| 9,652,382 B1 | 5/2017 | Subramanian et al. |
| 9,727,456 B2 | 8/2017 | Malwankar et al. |
| 9,734,050 B2 | 8/2017 | Sinclair et al. |
| 9,734,911 B2 | 8/2017 | Sinclair et al. |
| 9,740,716 B2 | 8/2017 | Wilhelmsson |
| 9,778,855 B2 | 10/2017 | Sinclair |
| 9,921,959 B2 * | 3/2018 | Liden .................. G06F 12/0269 |
| 9,971,683 B1 | 5/2018 | Bell et al. |
| 10,002,074 B2 | 6/2018 | Flood et al. |
| 10,108,543 B1 | 10/2018 | Duggal et al. |
| 10,108,544 B1 | 10/2018 | Duggal et al. |
| 10,120,613 B2 | 11/2018 | Sinclair et al. |
| 10,133,490 B2 | 11/2018 | Sinclair et al. |
| 10,255,179 B2 | 4/2019 | Ji et al. |
| 10,261,898 B1 | 4/2019 | Payer |
| 10,409,692 B1 * | 9/2019 | Brenner ................ G06F 3/0671 |
| 10,430,279 B1 | 10/2019 | Dittia et al. |
| 10,664,391 B2 | 5/2020 | Jang |
| 10,739,996 B1 | 8/2020 | Ebsen et al. |
| 10,795,812 B1 | 10/2020 | Duggal et al. |
| 10,929,288 B1 | 2/2021 | Moore et al. |
| 10,983,715 B2 | 4/2021 | Sharoni et al. |
| 10,983,908 B1 | 4/2021 | Zou et al. |
| 10,996,884 B2 | 5/2021 | Danilov et al. |
| 11,086,537 B2 | 8/2021 | Byun |
| 11,366,801 B1 | 6/2022 | Kumar et al. |
| 11,507,503 B1 | 11/2022 | Sterlund et al. |
| 11,573,894 B2 | 2/2023 | Österlund et al. |
| 12,197,324 B1 | 1/2025 | Österlund et al. |
| 2002/0059520 A1 | 5/2002 | Murakami et al. |
| 2003/0005027 A1 | 1/2003 | Borman et al. |
| 2003/0188141 A1 | 10/2003 | Chaudhry et al. |
| 2004/0186863 A1 | 9/2004 | Garthwaite |
| 2004/0187102 A1 | 9/2004 | Garthwaite |
| 2005/0066329 A1 | 3/2005 | Fischer et al. |
| 2005/0081190 A1 | 4/2005 | Betancourt et al. |
| 2005/0102670 A1 | 5/2005 | Bretl et al. |
| 2005/0114844 A1 | 5/2005 | Betancourt et al. |
| 2005/0149686 A1 | 7/2005 | Bacon et al. |
| 2005/0160413 A1 | 7/2005 | Broussard et al. |
| 2005/0160416 A1 | 7/2005 | Jamison |
| 2005/0188164 A1 | 8/2005 | Ballantyne et al. |
| 2005/0235006 A1 | 10/2005 | Adl-Tabatabai et al. |
| 2005/0267996 A1 | 12/2005 | O'Connor et al. |
| 2006/0005171 A1 | 1/2006 | Ellison |
| 2006/0026379 A1 | 2/2006 | Jung |
| 2006/0143168 A1 | 6/2006 | Rossmann |
| 2006/0143395 A1 | 6/2006 | Zohar et al. |
| 2007/0016633 A1 | 1/2007 | Lindholm et al. |
| 2007/0022149 A1 | 1/2007 | Bacon et al. |
| 2007/0033325 A1 | 2/2007 | Sinclair |
| 2007/0162528 A1 | 7/2007 | Wright et al. |
| 2007/0203960 A1 | 8/2007 | Guo |
| 2007/0234005 A1 | 10/2007 | Erlingsson et al. |
| 2008/0034175 A1 | 2/2008 | Traister et al. |
| 2008/0082596 A1 | 4/2008 | Gorobets |
| 2008/0086619 A1 | 4/2008 | Traister et al. |
| 2008/0140737 A1 | 6/2008 | Garst et al. |
| 2008/0162787 A1 | 7/2008 | Tomlin et al. |
| 2008/0189477 A1 | 8/2008 | Asano et al. |
| 2008/0250213 A1 | 10/2008 | Holt |
| 2009/0007075 A1 | 1/2009 | Edmark et al. |
| 2009/0037660 A1 | 2/2009 | Fairhurst |
| 2009/0119352 A1 | 5/2009 | Branda et al. |
| 2009/0132622 A1 | 5/2009 | Rossmann et al. |
| 2009/0158288 A1 | 6/2009 | Fulton et al. |
| 2009/0307292 A1 | 12/2009 | Li et al. |
| 2009/0319720 A1 | 12/2009 | Stefanus et al. |
| 2009/0328007 A1 | 12/2009 | Chen et al. |
| 2010/0011357 A1 | 1/2010 | Ramamurthy |
| 2010/0070727 A1 | 3/2010 | Harris et al. |
| 2010/0082710 A1 | 4/2010 | Kilner et al. |
| 2010/0114998 A1 | 5/2010 | Steensgaard et al. |
| 2010/0254254 A1 | 10/2010 | Chan et al. |
| 2010/0287350 A1 | 11/2010 | Ylonen |
| 2011/0145473 A1 | 6/2011 | Maheshwari |
| 2011/0145637 A1 | 6/2011 | Gray et al. |
| 2011/0161784 A1 | 6/2011 | Selinger et al. |
| 2011/0208792 A1 | 8/2011 | Printezis et al. |
| 2011/0246543 A1 | 10/2011 | Gracie et al. |
| 2011/0286420 A1 | 11/2011 | Cho et al. |
| 2012/0203804 A1 | 8/2012 | Burka et al. |
| 2013/0054925 A1 | 2/2013 | Hsia |
| 2013/0073821 A1 | 3/2013 | Flynn et al. |
| 2013/0138703 A1 | 5/2013 | Daynes et al. |
| 2013/0227236 A1 | 8/2013 | Flynn et al. |
| 2013/0290648 A1 | 10/2013 | Shao et al. |
| 2013/0318132 A1 | 11/2013 | Basu et al. |
| 2013/0332909 A1 | 12/2013 | Odaira et al. |
| 2014/0032922 A1 | 1/2014 | Spilman |
| 2014/0033213 A1 | 1/2014 | Hudson et al. |
| 2014/0101372 A1 | 4/2014 | Jung et al. |
| 2014/0108817 A1 | 4/2014 | Chen et al. |
| 2014/0195818 A1 | 7/2014 | Neumann et al. |
| 2014/0278447 A1 | 9/2014 | Unoki et al. |
| 2014/0283040 A1 | 9/2014 | Wilkerson et al. |
| 2014/0310235 A1 | 10/2014 | Chan et al. |
| 2014/0325148 A1 | 10/2014 | Choi et al. |
| 2014/0359201 A1 | 12/2014 | Chakrabarti |
| 2014/0365719 A1 | 12/2014 | Kuzmin et al. |
| 2015/0006843 A1 | 1/2015 | Moser |

(56) References Cited

U.S. PATENT DOCUMENTS

| | | |
|---|---|---|
| 2015/0026167 A1 | 1/2015 | Neels et al. |
| 2015/0058381 A1 | 2/2015 | Wilhelmsson |
| 2015/0081996 A1 | 3/2015 | Flood |
| 2015/0100752 A1 | 4/2015 | Flood |
| 2015/0227416 A1 | 8/2015 | Reinart |
| 2015/0227602 A1 | 8/2015 | Ramu et al. |
| 2015/0365941 A1 | 12/2015 | Liu et al. |
| 2015/0378870 A1 | 12/2015 | Marron et al. |
| 2016/0012280 A1 | 1/2016 | Ito et al. |
| 2016/0042015 A1 | 2/2016 | Landau et al. |
| 2016/0124802 A1 | 5/2016 | Gabor et al. |
| 2016/0163381 A1 | 6/2016 | Lee |
| 2016/0170649 A1 | 6/2016 | Ramesh et al. |
| 2016/0179580 A1 | 6/2016 | Benedict |
| 2016/0239413 A1 | 8/2016 | Stephens et al. |
| 2016/0246713 A1 | 8/2016 | Choi et al. |
| 2016/0283369 A1 | 9/2016 | Hada |
| 2016/0350214 A1 | 12/2016 | Payer et al. |
| 2017/0006135 A1 | 1/2017 | Siebel et al. |
| 2017/0039242 A1 | 2/2017 | Milton et al. |
| 2017/0123655 A1 | 5/2017 | Sinclair et al. |
| 2017/0177168 A1 | 6/2017 | Abudib et al. |
| 2017/0177471 A1 | 6/2017 | Frazier et al. |
| 2017/0242790 A1 | 8/2017 | O'Krafka et al. |
| 2017/0262364 A1 | 9/2017 | Liden et al. |
| 2017/0344473 A1 | 11/2017 | Gidra et al. |
| 2018/0074854 A1 | 3/2018 | Chan |
| 2018/0173728 A1 | 6/2018 | Munakata |
| 2018/0189175 A1 | 7/2018 | Ji et al. |
| 2018/0276120 A1 | 9/2018 | Vytiniotis et al. |
| 2018/0335968 A1 | 11/2018 | Pauley et al. |
| 2018/0365106 A1 | 12/2018 | Huang et al. |
| 2019/0042406 A1 | 2/2019 | Guniguntala et al. |
| 2019/0042440 A1 | 2/2019 | Kumar et al. |
| 2020/0012600 A1 | 1/2020 | Konoth et al. |
| 2020/0012647 A1 | 1/2020 | Johnson et al. |
| 2020/0026781 A1 | 1/2020 | Khot et al. |
| 2020/0081748 A1 | 3/2020 | Johnson et al. |
| 2020/0089420 A1 | 3/2020 | Sharoni et al. |
| 2020/0125364 A1 | 4/2020 | Osterlund |
| 2020/0192794 A1 | 6/2020 | Lee |
| 2020/0202127 A1 | 6/2020 | Chen et al. |
| 2020/0218653 A1 | 7/2020 | Ryu |
| 2020/0250084 A1 | 8/2020 | Stephens et al. |
| 2020/0310686 A1 | 10/2020 | Truong et al. |
| 2020/0310963 A1 | 10/2020 | Nilsen |
| 2020/0327052 A1 | 10/2020 | Nilsen |
| 2020/0379902 A1 | 12/2020 | Durham et al. |
| 2021/0124608 A1 | 4/2021 | Shveidel et al. |
| 2021/0200546 A1 | 7/2021 | Lemay et al. |
| 2021/0278990 A1 | 9/2021 | Choi |
| 2021/0342362 A1 | 11/2021 | Haravu et al. |
| 2021/0406216 A1 | 12/2021 | Komatsu et al. |
| 2022/0058732 A1 | 2/2022 | Reses |
| 2022/0138098 A1 | 5/2022 | Osterlund et al. |
| 2022/0188432 A1 | 6/2022 | Turmel et al. |

FOREIGN PATENT DOCUMENTS

| | | |
|---|---|---|
| WO | 00/29937 A2 | 5/2000 |
| WO | 2016/073019 A1 | 5/2016 |
| WO | 2017/053754 A1 | 3/2017 |
| WO | 2017/178114 A9 | 12/2017 |

OTHER PUBLICATIONS

The Z Garbage Collector—Low Latency GC OpenJDK, available online at <http://cr.openjdk.java.net/~pliden/slides/ZGC-Jfokus-2018.pdf>, 2018, 96 pages.

Title: Detecting and eliminating memory leaks using cyclic memory allocation, author: JJ Nguyen et al., published on 2007.

Title: Reconsidering custom memory allocation; author:: ED Berger et al, published on 2002.

Title: Understanding memory allocation of Scheme programs author: M Serrano published on 2000.

Vechev et al. "Write Barrier Elision for Concurrent Garbage Collectors", 2004 (Year: 2004).

Verma A., "The comprehensive guide to react's virtual DOM", May 15, 2021, pp. 23.

Wilson, P.R., et al., "A "Card-making" scheme for controlling intergenerational differences in generation—based garbage collection on stock hardware," ACM SIGPLAN Notices, vol. 24, Issue 5, May 1989, pp. 87-92.

Yang et al., "Deep Dive into ZGC: A Modern Garbage Collector in OpenJDK", ACM Transactions on Programming Languages and Systems, vol. 44, No. 4, Article 22, Aug. 2022, 34 pages.

Yang et al., "Improving Program Locality in the GC using Hotness," PLDI' 20, pp. 301-313, Jun. 15-20, 2020.

Yuasa et al., "Return Barrier," International Lisp Conference, 2002, 12 pages.

Yuasa, T., "Real-time garbage collection on general-purpose machines," Journal of Systems and Software, vol. 11, Issue 3, <arch 1990, pp. 181-198.

ZGC Concurrent Class Unloading—Another Safepoint Operation Bites the Dust: available online at <http://cr.openjdk.java.net/~pliden/slides/ZGC-Jfokus-2019.pdf>, Feb. 4, 2019, 55 pages.

Zhao et al., "Low-latency, high-throughput garbage collection", PLDI 2022: Proceedings of the 43rd ACM SIGPLAN International Conference on Programming Language Design and Implementation, Jun. 2022, pp. 76-91.

"Basic Graph Algorithms", Indian Computing Olympiad, Retrieved from https://www.iarcs.org.in/inoi/online-study-material/topics/graphs-dfs.php, Retrieved on Dec. 8, 2022, pp. 3.

"JEP 439: Generational ZGC", Retrieved from https://openjdk.org/jeps/439, Oct. 7, 2024, pp. 1-9.

"Lazy Compaction", Retrieved from https://wiki.se.oracle.com/display/JPG/Lazy+Compaction, Retrieved on Sep. 20, 2022, 2 Pages.

"React as UI runtime", Overreacted, Feb. 2, 2019, pp. 38.

"Recitation 8—Dijkstra's Algorithm and DFS Numberings", Parallel and Sequential Data Structures and Algorithms, 15-210 (Fall 2013), Oct. 16, 2013, pp. 1-6.

"What is Schema?" Retrieved from https://github.com/json-schema-org/understanding-json-schema, Jan. 11, 2023, pp. 3.

"ZGC—Generations Revision 2," accessed at https://wiki.se.oracle.com/display/JPG/ZGC+-+Generations+Revision , Feb. 1, 2020, pp. 6.

A concurrent, generational garbage collector for a multithreaded implementation of ML by Doligez (Year: 1993).

A Hardware Accelerator for Tracing Garbage Collection by Maas (Year: 2018).

Armbrust Michael Michael@Databricks Com et al, "Spark SQL Relational Data Processing in Spark," Proceedings of The 2015 ACM SIGMOD International Conference on Management of Data, SIGMOD '15, ACM Press, New York, New York, USA, May 27, 2015, pp. 1383-1394.

Benjamin Zorn, Barrier Methods for Garbage Collection, Nov. 1990, UC Boulder available at: https://spl.cde.state.co.us/artemis/ucbserials/ucb51110internet/1990/ucb51110494internet.pdf(Year: 1990).

Boehm et al.; "Efficient In-Memory Indexing with Generalized Prefix Trees", downloaded from https://pdfs.Semanticscholar.org/c5ca/a359fe6b345580a4dd476d5dd41 a90bf301c.pdf; Mar. 26, 2018.

Click et al.; "The Pauseless GC Algorithm", VEE 05, Jun. 11-12, 2005, Chicago, Illinois, USA. Copyright 2005 ACM 1-59593-047-7/05/0006 . . . S5.00.

Clifford et al., "Memento Mori: Dynamic Allocation-Site-Based Optimizations", ACM SIGPLAN Notices, vol. 50, No. 11, Jun. 14, 2015, pp. 105-117.

David Gnedt, "Fast Profiling in the HotSpot Java VM with Incremental Stack Tracing and Partial Safepoints," Faculty of Engineering and Natural Sciences, 2014, 57 pages.

Detlefs; "Concurrent Remembered Set Refinement in Generational Garbage Collection", Proceedings of the USENIX Java VM '02 Conference, Aug. 1-2, 2002, San Francisco, CA.

Domani et al., "Implementing an On-the-fly Garbage Collector for Java," ACM SIGPLAN Notices, vol. 36, No. 1, 2000, pp. 155-166.

(56) References Cited

OTHER PUBLICATIONS

Dorai et al., Control delimiters and their hierarchies, LISP and Symbolic Computation: An International Journal, vol. 3, 1990, pp. 67-99.

Ellis D., "What is Swagger? A beginner's guide", Jul. 26, 2022, pp. 6.

Feng et al.; "Trie-join: a trie-based method for efficient string similarity joins", Published online Oct. 4, 2011; The VLDB Journal Springer-Verlag 2011.

Fitzgerald; "The Case for Profile Directed Selection of Garbage Collectors", Proceedings of the 2nd International Symposium on Memory Management, ACM, New York, NY USA, 111-120, DOI= 10.1145/362422.362472, http://doi.acm.org/10.1145/362422. 362472.

Generational Garbage Collection, Write Barriers/Write Protection and userfaultfd(2) by Cracauer (Year: 2016).

Getting started with Z Garbage Collector(ZGC) in Java 11 [Tutorial] by Davis (Year: 2019).

Goetz, Java theory and practice Garbage collection in the HotSpot JVM, Generational and concurrent garbage collection, IBM Developer Works, Nov. 25, 2003.

Harris T, et al., "Dynamic filtering: multi-purpose architecture support for language runtime systems," ACM SIGARCH Computer Architecture News, vol. 38, Issue 1, Mar. 2010, pp. 39-52.

Heule et al., "HyperLogLog in practice: algorithmic engineering of a state of the art cardinality estimation algorithm," EDBT '13: Proceedings of the 16th International Conference on Extending Database Technology, Mar. 2013, pp. 683-692.

Hosking; "A Comparative Performance Evaluation of Write Barrier Implementations", Proceedings ACM Conference on Object-Oriented Programming Systems, Languages and Applications, Vancouver, Canada, Oct. 1992, pp. 92-109.

How to Implement Java's hashCode Correctly, May 19, 2016, Available online at <https://www.sitepoint.com/how-to-implement-javas-hashcode-correctly/>, 7 pages.

JDK 15, Available online at < https://openjdk.java.net/projects/jdk/15/ >, Last updated, Sep. 15, 2020, 2 pages.

JEP 333: ZGC: A Scalable Low-Latency Garbage Collector(Experimental) by Liden and Karlsson (Year: 2020).

Joisha; "Sticky Tries: Fast Insertions, Fast Lookups, No Deletions for Large Key Universe", ISMM '14, Jun. 12, 2014, Edinburgh UK.

Kliot et al., "A Lock-Free, Concurrent, and Incremental Stack Scanning for Garbage Collectors," In Proceedings of the ACM SIGPLAN/SIGOPS International Conference on Virtual Execution Environments (VEE '09), 2009, pp. 11-20.

Lokesh Gupta, "Java Secure Hashing—MD5, SHA256, SHA512, PBKDF2, BCrypt, Scrypt," Available online at <https://howtodoinjava.com/security/how-to-generate-secure-password-hash-md5-sha-pbkdf2-bcrypt-examples/> printed on Apr. 14, 2020, 38 pages.

M. Felleisen et al., Beyond Continuations: Technical Report No. 216, Feb. 1987, 13 pages.

Main—Main—OpenJDK Wiki, Created by Iris Clark, last modified by Per Liden, available online at <URL: https://wiki.openjdk.java.net/display/zgc/Main>, Oct. 15, 2020, 9 pages.

Mohamed A. El-Zawawy, "Recognition of Logically Related Regions Based Heap Abstraction", Journal of the Egyptian Mathematical Society, vol. 20, Issue 2, Jul. 2012, pp. 64-71, arXiv: 1212.5094 [cs.LO].

Mostly Concurrent Garbage Collection Revisited by Barabash (Year: 2003).

Olsson et al.; "Trash a dynamic LC-trie and hash data structure", Trita-CSC-TCS 2006:2, ISRN/KTH/CSC/CS-2006/2-SE, ISSN 1653-7092, Aug. 18, 2006.

Open JDK, "HotSpot Glossary of Terms", 2006, Sun Microsystems, available at <https://openjdk.java.net/groups/hotspot/docs/HotSpotGlossary.html>, 6 pages.

Osterlund E., "Garbage Collection supporting automatic JIT parallelization in JVM", Computer Science, Jun. 26, 2012, pp. 29.

Osterlund E., "Going Beyond On-The-Fly Garbage Collection and Improving Self-Adaptation with Enhanced Interfaces", Computer Science, 2019, pp. 68.

Osterlund et al., "Block-Free Concurrent GC: Stack Scanning and Copying," International Symposium on Memory Management, vol. 51, 2016, 12 pages.

Per Liden, The Design of ZGC—A scalable Low-Latency Garbage Collector for Java: available online at <http://cr.openjdk.java.net/~pliden/slides/ZGC-PLMeetup-2019.pdf>, Jun. 12, 2019, 84 pages.

Pufek et al., "Analysis of Garbage Collection Algorithms and Memory Management in Java", 2019 42nd International Convention on Information and Communication Technology, Electronics and Microelectronics (MIPRO), Croatian Society MIPRO, May 20, 2019, pp. 1677-1682.

Robbin Ehn, "JEP 312: Thread-Local Handshakes," Hotspot Dash Dev at Openjdk Dot Java Dot Net, available at <http://openjdk.java.net/jeps/312>, 2018, 3 pages.

Rogers I., "Reducing and eliding read barriers for concurrent garbage collectors," ICOOOLPS '11: Proceedings of the 6th Workshop on Implementation, Compilation, Optimization of Object-Oriented Languages, Programs and Systems, Jul. 2011, Article No. 5, pp. 1-5.

Ryan Sciampacone et al, "Garbage collection in WebSphere Application Server V8, Part 2: Balanced garbage collection as a new option", IBM developerWorks, Aug. 3, 2011.

Saxena et al., "Key and Value Paired Data using Java Hash Table," International Journal of Engineering and Management Research, vol. 4, Issue 1, Feb. 2014, pp. 81-89.

Shoravi L., "Compressing Pointers for the Z Garbage Collector", Runtime compression of pointers in a concurrent setting, Jun. 2023, 38 Pages.

Stefan Karlsson, JEP 439: Generational ZGC, Aug. 25, 2021, OpenJDK, available at: https://openjdk.org/jeps/439 (Year: 2021).

Herlihy et al., "Software transactional memory for dynamic-sized data structures", PODC '03: Proceedings of the twenty-second annual symposium on Principles of distributed computing, Jul. 13, 2003, pp. 92-101.

Huang et al., "Precise and maximal race detection from incomplete traces", ACM SIGPLAN Notices, vol. 51, No. 10, Oct. 19, 2016, pp. 462-476.

O'Callahan et al., "Hybrid dynamic data race detection", PPoPP '03: Proceedings of the ninth ACM SIGPLAN symposium on Principles and practice of parallel programming, Jun. 11, 2003, pp. 167-178.

Osterlund E., "Data Race Free Java: Transactional Memory+ thread local GC", Aug. 19, 2024, pp. 3.

Savage et al., "Eraser: a dynamic data race detector for multithreaded programs", ACM Transactions on Computer Systems, vol. 15, No. 4, Nov. 1, 1997, pp. 391-411.

Shavit et al., "Software Transactional Memory", 1995, pp. 204-213.

GeeksforGeeks, "Thread in Operating System", Aug. 16, 2019, pp. 1-4, https://web.archive.org/web/20200926013500/https://www.geeksforgeeks.org/thread-in-operating-system/ (Year: 2019).

Guy Harris, "Thread (computing)", Dec. 2022, pp. 1-10, https://en.wikipedia.org/w/index.php?title=Thread_(computing)&oldid=1128791380 (Year: 2022).

Stephen J. Bigelow, "thread", Aug. 2023, pp. 1-10, https://www.techtarget.com/whatis/definition/thread (Year: 2023).

Sun Microsystems, "What Is a Thread?", 2005, pp. 1-2, https://www.iitk.ac.in/esc101/05Aug/tutorial/essential/threads/definition.html#:~:text=Definition:%20A%20thread%20is%20a,tasks%20in%20a%20single%20program. (Year: 2005).

* cited by examiner

Class File 200

Virtual Machine Memory Layout
300

600

700

800

| Address Bits 802 | Remapping Bits 804 | Old Strong Marking Bits 806 | Young Strong Marking Bits 808 | Old Marking Bits 810 | Young Marking Bits 812 | Remebered Bits 814 | Extra Bits 816 |

1100

TECHNIQUES FOR CONCURRENT MULTI-GENERATION GARBAGE COLLECTION

TECHNICAL FIELD

The present disclosure relates to garbage collection processes. In particular, the present disclosure relates to concurrent generational garbage collection processes.

BACKGROUND

With respect to a computing architecture, the term "concurrency" refers to the ability of a computing system to perform multiple tasks simultaneously and/or the ability of the computing system to perform multiple tasks in overlapping time periods. Concurrency can improve the efficiency and performance of a computing system. However, concurrency can give rise to an issue that results from one operation interfering with another operation that is being performed at the same time (referred to as a "concurrency issue"). Examples of concurrency issues include termination indeterminism, race conditions, deadlock, livelock, starvation, and others.

In the field of computer science, the term "garbage collection" is used to refer to memory management. For example, a "garbage collection process" may refer to a process for reclaiming memory allocated to a program instance. Once memory allocated to a program instance has been reclaimed by a garbage collection process, that reclaimed memory may be reused by that program instance or another program instance.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
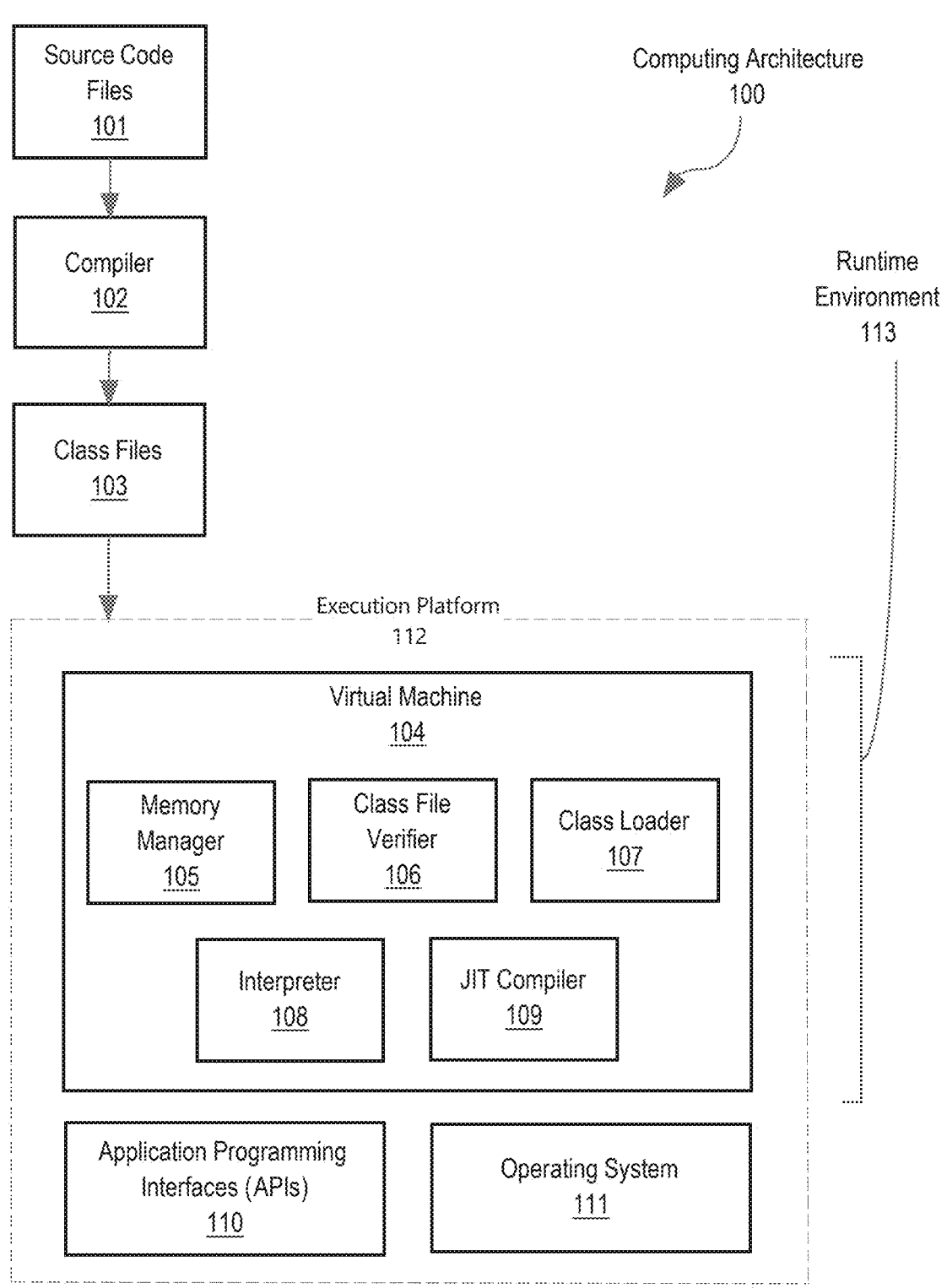
FIG. 1 illustrates an example computing architecture in which techniques described herein may be practiced according to an embodiment.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

The following table of contents is provided for the reader's convenience and is not intended to define the limits of the disclosure.

1. GENERAL OVERVIEW
2. ARCHITECTURAL OVERVIEW
   2.1 EXAMPLE CLASS FILE STRUCTURE
   2.2 EXAMPLE VIRTUAL MACHINE ARCHITECTURE
   2.3 LOADING, LINKING, & INITIALIZING
   2.4 EXAMPLE MEMORY AREA
3. GARBAGE COLLECTION SYSTEM
4. GARBAGE COLLECTION CYCLE
5. COLORED POINTER ARCHITECTURE
6. MANAGING REFERENCE OBJECTS
   6.1 MARKING REFERENCE OBJECTS
   6.2 PROCESSING REFERENCE OBJECTS
7. EXAMPLE EMBODIMENT
8. HARDWARE OVERVIEW
9. MISCELLANEOUS; EXTENSIONS

1. GENERAL OVERVIEW

While subjecting a memory area to a garbage collection process, one or more embodiments (a) apply one set of rules for processing soft reference objects during one concurrent garbage collection cycle targeting a young generation of the memory area and (b) apply a different set of rules for processing soft reference objects during another concurrent garbage collection cycle targeting an old generation of the memory area. To enable the system to perform both concurrent garbage collection cycles at the same time without experiencing concurrency issues in either generation, the system tracks any given runtime object's level of accessibility with respect to both generations of the memory area by embedding metadata into unused bits within a pointer that refers to that given runtime object. As used herein, the term "concurrent garbage collection cycle" refers to a garbage collection cycle that includes at least one phase of concurrent operations, and the term "phase of concurrent operations" refers to a period of time in which multiple operations may be performed concurrently in the same computing environment. For brevity, a phase of concurrent operations may be referred to herein in short as a "concurrent phase."

During a garbage collection process, an embodiment processes reference objects residing in multiple generations of a memory area. A generation is a subdivision of the memory area that is used to organize runtime objects resid-ing in the memory area. A reference object is a special type of runtime object that is used to indirectly refer to another runtime object. Processing a reference object may result in runtime objects that are accessible through that reference object being collected by the garbage collection process. Note that the system processes reference objects during a phase of a garbage collection cycle called a "reference processing phase." In an example, the system organizes the memory area into generations based on temporal character-istics of the runtime objects residing in the memory area. For instance, the system may organize the memory area into a young generation and an old generation. As the names suggest, the young generation contains younger runtime objects, and the old generation contains older runtime objects. Note that in this example, aging runtimes objects are being promoted from the young generation to the old generation while the garbage collection process is ongoing. While performing the garbage collection process in this example, the system processes reference objects residing in the young generation, and the system processes reference objects residing in the old generation.

During a garbage collection process, an embodiment applies (a) one rule set for processing reference objects residing in one generation of a memory area and (b) another rule set for processing reference objects residing in another generation of the memory area. For instance, the different rule sets may define different rules for treating soft reference objects residing in the different generations. A soft reference object is one example of a type of reference object. As an example, assume that the system is performing both (a) one garbage collection cycle targeting a young generation of the memory area and (b) another garbage collection cycle targeting an old generation of the memory area. In this example, the one rule set for the young generation dictates that soft reference objects residing in the young generation are not to be processed during the one garbage collection cycle targeting the young generation. Furthermore, in this example, the other rule set dictates that any given soft reference object residing in the old generation may or may not be processed with other reference objects during the other garbage collection cycle targeting the old generation depending on how recently that given soft reference object was last used by a program instance. The system gauges how recently a soft reference object residing in the old generation was used by a program instance relative to a timestamp that tracks when reference objects residing in the old generation were last processed. When the system processes reference objects during the other garbage collection cycle targeting the old generation, the system updates the timestamp. In contrast, when the system processes reference objects during the one garbage collection cycle targeting the young gen-eration, the system does not update the timestamp.

An embodiment simultaneously performs multiple con-current reference processing phases in separate generations of a memory area at the same time. A concurrent reference processing phase is one example of a concurrent phase that may be included in a concurrent garbage collection cycle. During an example concurrent reference processing phase of a garbage collection cycle, the system processes reference objects residing in a particular generation of the memory area while a program instance is simultaneously enabled to manipulate runtime objects residing in the particular gen-eration of the memory area (referred to as a "concurrent reference processing phase"). Note that a program instance manipulating a reference object during a concurrent refer-ence processing phase could lead to the manifestation of a concurrency issue. As an example, assume that the memory area includes a young generation and an old generation. In this example, the system performs one concurrent reference processing phase in the young generation of the memory area while the system is also performing another concurrent reference processing phase in the old generation of the memory area. It should also be noted that in this example, the system is required to be on guard to prevent concurrency issues that could arise in either generation. For instance, the system is required to prevent two concurrency issues that respectively arise in the two generations of the memory area at the same time.

An embodiment colors a pointer that refers to a runtime object residing in a multi-generation memory area to reflect that runtime object's state with respect to each of the multiple generations of the memory area. As used herein, "coloring a pointer" refers to embedding metadata into unused bits within the pointer (e.g., bits within the pointer that are not needed to store the binary address of a location in memory). As an example, assume that a garbage collec-tion process is targeting a memory area that includes a young generation and an old generation, and further assume that the runtime object initially resides in the young generation. During the garbage collection process of this example, the system is performing one concurrent phase in the young generation while the system is also performing another concurrent phase in the old generation at the same time. In this example, the system colors the pointer that refers to the runtime object to track (a) if the runtime object possesses a lesser level of accessibility while residing in the young generation, (b) if the runtime object possess a greater level of accessibility while residing in the young generation, (c) if the runtime object possesses the lesser level of accessibility while residing in the old generation, and (d) if the runtime object possesses the greater level of accessibility while residing in the old generation. The state information that the system embeds into the pointer in this example may be a necessary input for the system to prevent a concurrency issue from arising in either generation during either concur-rent phase. Note that at any point during the garbage collection process of this example, the runtime object may be promoted from the young generation to the old genera-tion. Further note that if the runtime object is promoted during the one concurrent phase occurring in the young generation, the pointer may need to maintain a record of the runtime object's former accessibility within the young gen-eration to prevent concurrency issues during the one con-current phase and/or subsequent concurrent phases of the garbage collection cycle targeting the young generation. At the same time, the pointer may need to maintain a record of the runtime object's accessibility within the old generation to prevent concurrency issues that may arise during the other concurrent phase occurring in the old generation and/or subsequent concurrent phases of the garbage collection cycle targeting the old generation. By coloring the pointer to record the runtime object's accessibility with respect to both generations, the system is enabled to enforce restraints on a program instance that contribute to the system preventing the concurrency issues that may arise in either generation.

One or more embodiments described in this Specification and/or recited in the claims may not be included in this General Overview section.

2. ARCHITECTURAL OVERVIEW

FIG. 1 illustrates an example architecture in which tech-niques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, etc. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, etc. However, depending on the program being executed, the startup time can be significant. In addition, inserting new code would require the program to be taken offline, recompiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation at runtime. Furthermore, since various instructions are analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting instructions individually. There are several variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, etc.).

The following discussion assumes that the class files 103 represents a respective "class" defined in the source code files 101 (or dynamically generated by the compiler 102/ virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, etc. Further, some classes (or fields/methods within those classes) may include access restrictions that limit their use to within a particular class/library/package or to classes with appropriate permissions.

2.1 Example Class File Structure

Figure 2:
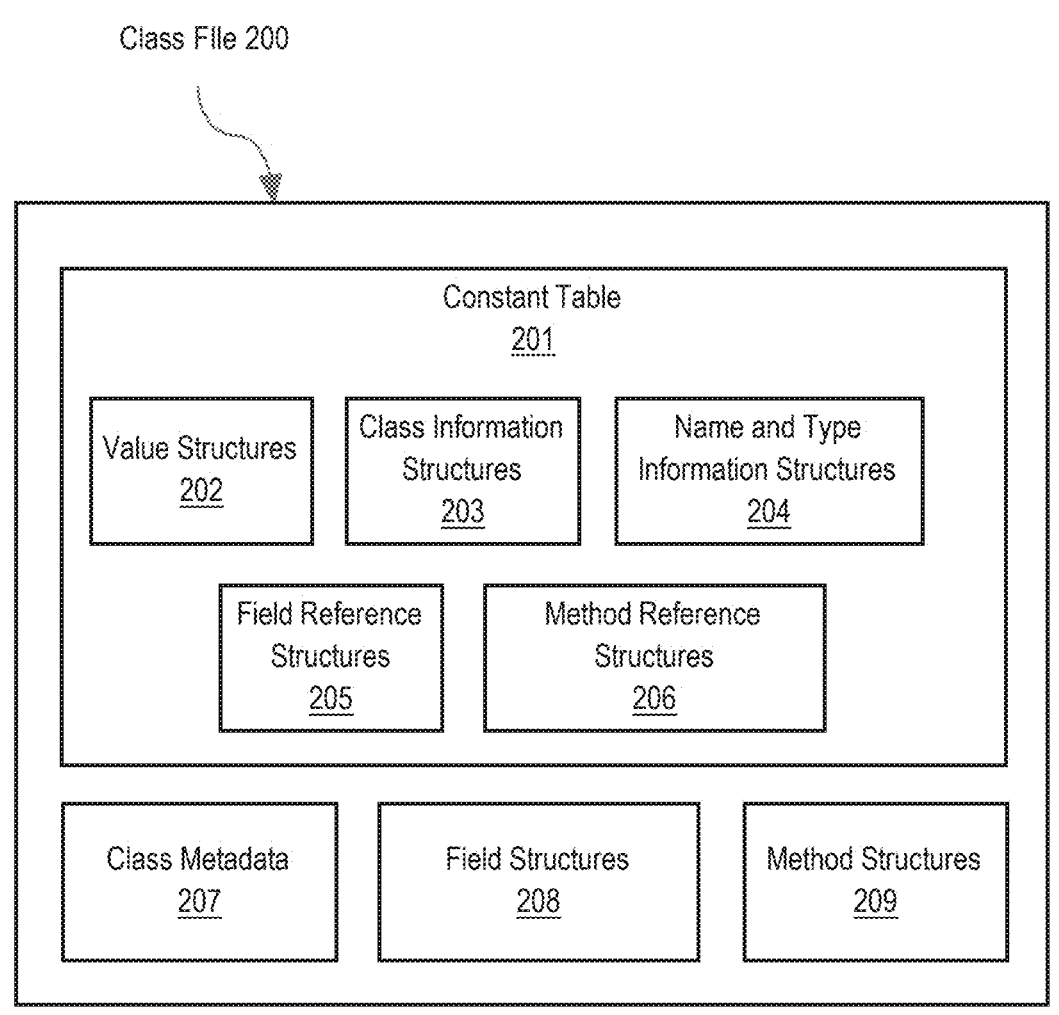
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, class metadata 207, field structures 208, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, etc.), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (if the class is public, private, final, abstract, etc.), an index to one of the class information structures 203 of the constant table 201 that identifies the present class, an index to one of the class information structures 203 of the constant table 201 that identifies the superclass (if any), etc.

In an embodiment, the field structures 208 represent a set of structures that identifies the various fields of the class. The field structures 208 store, for a field of the class, accessor flags for the field (if the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for a method of the class, accessor flags for the method (e.g. if the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where an index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m (int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

```
class A
{
    int add12and13 ( ) {
        return B.addTwo(12, 13);
    }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
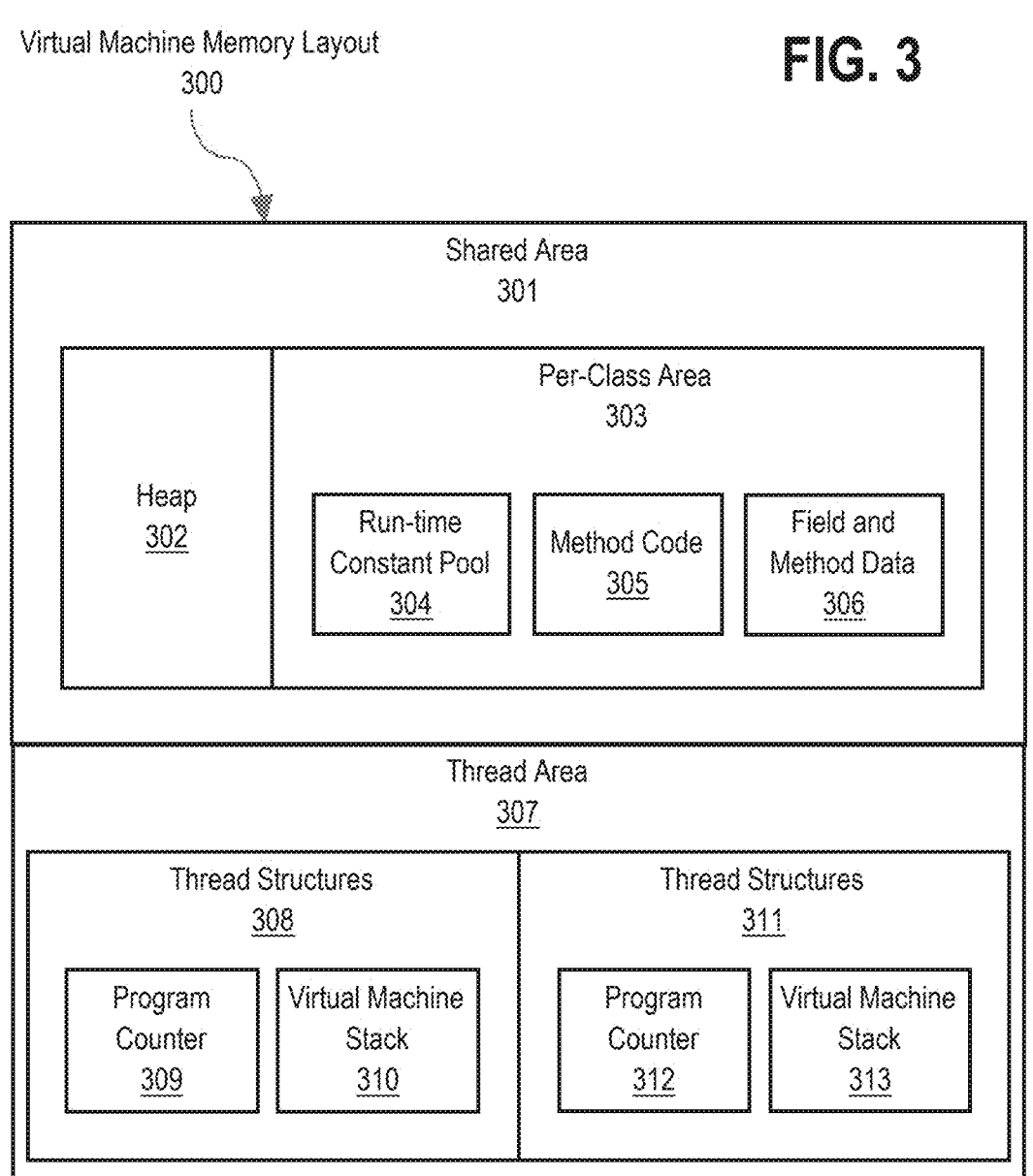
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for a loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
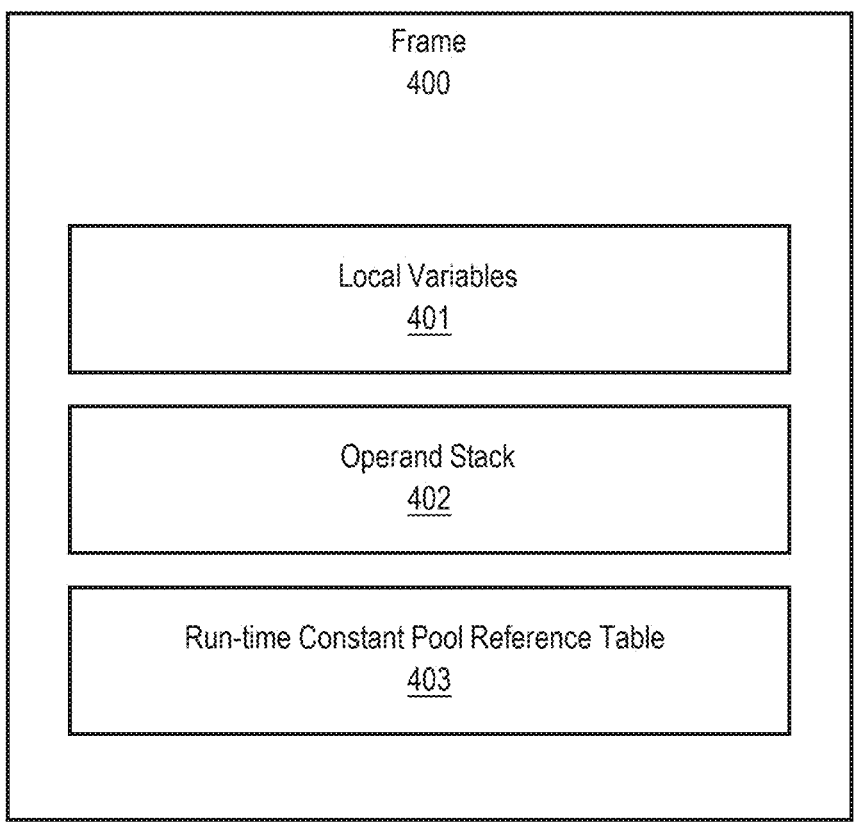
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, when the frame 400 is created by the virtual machine 104, the operand stack 402 is empty by default. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, & Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the representation from the associated class file 200 may include creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, etc. Thus, progress through the stages of loading, linking, and initializing can differ from class to class. Furthermore, some embodiments may delay (perform "lazily") one or more functions of the loading, linking, and initializing process until the class is required. For example, resolution of a method reference may be delayed until a virtual machine instruction invoking the method is executed. Thus, the exact timing of when the steps are performed for each class can vary greatly between implementations.

To begin the loading process, the virtual machine 104 invokes the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines if the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and resolves the symbolic references defined in the run-time constant pool 304 of the class.

To verify the class, the virtual machine 104 checks if the in-memory representation of the class is structurally correct. For example, the virtual machine 104 may check that each class except the generic class Object has a superclass, check that final classes have no sub-classes and final methods are not overridden, check if constant pool entries are consistent with one another, check if the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), etc. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking if the field/method is defined in the referenced class. Otherwise, the virtual machine 104 recursively searches through the super-classes of the referenced class for the referenced field/method until the field/method is located, or the top-level superclass is reached, in which case an error is generated.

2.4 Example Memory Area

Figure 5:
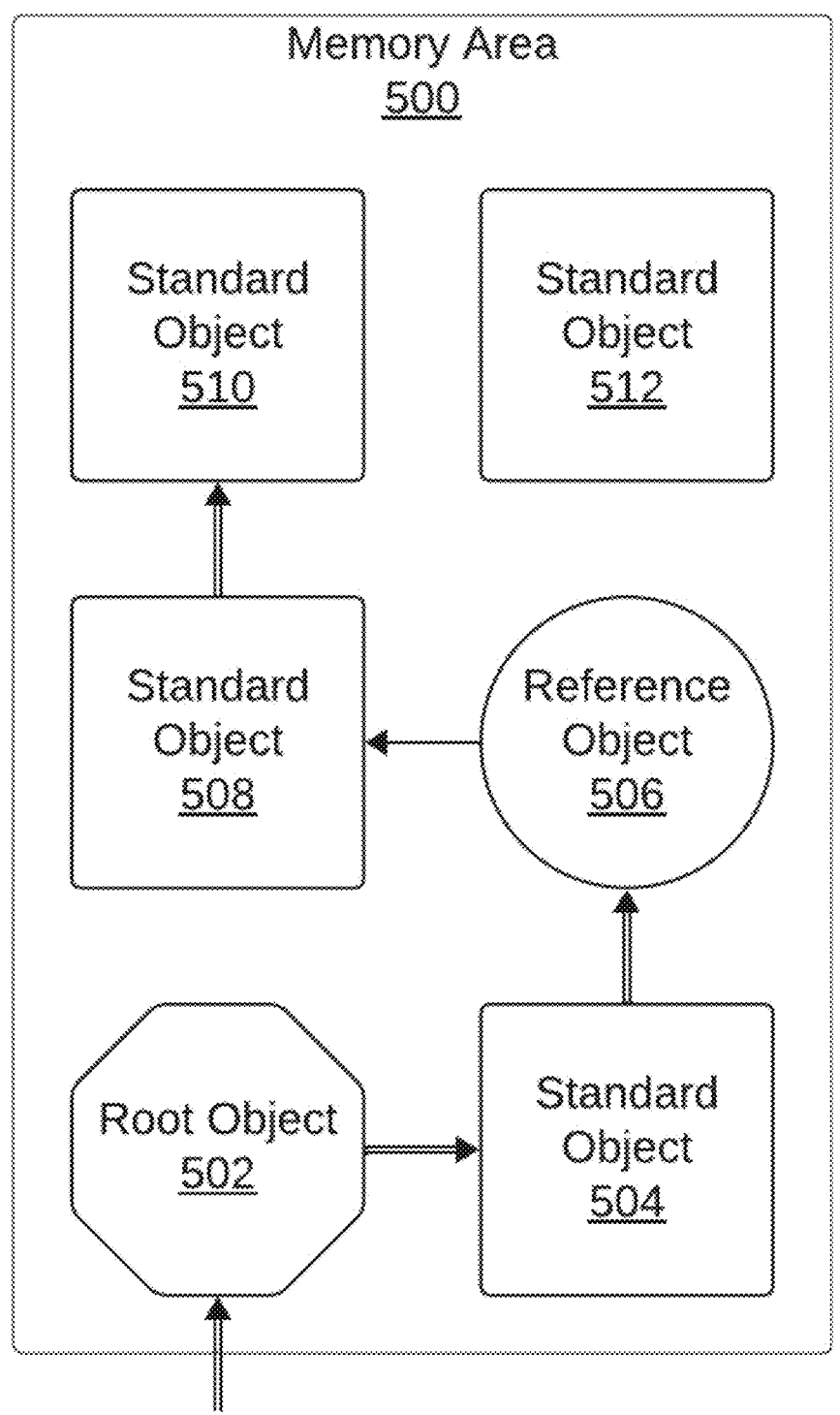
FIG. 5 illustrates an example memory area in which techniques described herein may be practiced according to an embodiment.

FIG. 5 illustrates an example memory area 500 in which techniques described herein may be practiced in accordance with one or more embodiments. A detailed example is described in this Section 2.4 for purpose of clarity and understanding. Components and/or operations described below should be understood as one specific example that may not be applicable to certain embodiments. Accordingly, components and/or operations described below should not be construed as limiting the scope of any of the claims.

In an embodiment, a memory area 500 is allocated for storing runtime objects associated with one or more program instances. The runtime objects residing in memory area 500 are instantiations of reference types (e.g., classes). One runtime object residing in memory area 500 may refer to another runtime object residing in memory area 500 by possessing an object field that holds a reference to the other runtime object. Runtime objects are represented in FIG. 5 as enclosed planar shapes (e.g., a circle, a square, a hexagon, etc.). References to runtime objects residing in memory area 500 are represented in FIG. 5 as arrows. A conceptualization of runtime objects that are linked together by references between the runtime objects (e.g., as depicted in FIG. 5) may be referred to herein as an "object graph." Note that (a) the example illustrated by FIG. 5 is limited to depicting references and runtime objects residing in memory area 500 that are exposed at a program level and (b) FIG. 5 does not depict any references or runtime objects residing in memory area 500 that are not exposed at a program level. To provide clear examples, the remainder of the discussion in this Section 2.4 with reference to FIG. 5 assumes that memory area 500 includes no runtime objects or references that are exposed at a program level other than those runtime objects and references that are illustrated in FIG. 5.

In an embodiment, a memory area 500 includes root object(s). As used herein, the term "root object" refers to a runtime object that is referred to by a root, and the term "root" identifies a reference to a runtime object that may serve as an entry point to a memory area that the runtime object resides in. In the example illustrated by FIG. 5, memory area 500 includes a single root object 502. However, it should be understood that a memory area 500 can (and often does) include multiple root objects. Note that the root that refers to runtime object 502 does not originate from any other runtime object within memory area 500. Instead, the root originates from somewhere outside of memory area 500. For example, the root that is pointing to root object 502 may be held by a stack variable, a global variable, a static variable, a local variable, or another data structure outside of memory area 500.

In an embodiment, a memory area 500 includes standard object(s). As used herein, the term "standard object" refers to a runtime object that is neither a root object nor a reference object. In the example illustrated by FIG. 5, memory area 500 includes standard object 504, standard object 508, standard object 510, and standard object 512.

In an embodiment, a memory area 500 includes reference object(s). A reference object is a special type of runtime object that is used to indirectly refer to another runtime object. A runtime object that a reference object is used to refer to is identified as the reference object's "referent." Examples of reference objects include soft reference objects, weak reference objects, final reference objects, phantom reference objects, and others. Note that, unlike other example reference objects, a final reference object is not exposed at the program level. In the example illustrated by FIG. 5, memory area 500 includes reference object 506, and standard object 508 is the referent of reference object 506. Standard object 504 indirectly refers to standard object 508 through reference object 506.

It should be noted that reference objects are often referred to colloquially as "references" rather than "objects." For example, a soft reference object is often referred to as a "soft reference," a weak reference object is often referred to as a "weak reference," a final reference object is often referred to as a "final reference," and a phantom reference object is often referred to as a "phantom reference." However, for the purposes of clarity and understanding, reference objects are not intentionally referred to herein as references rather than objects. Instead, as used herein, the term "soft reference" identifies a reference that links a soft reference object to the soft reference object's referent, the term "weak reference" identifies a reference that links a weak reference object to the weak reference object's referent, the term "final reference" identifies a reference that links a final reference object to the final reference object's referent, and the term "phantom reference" identifies a reference that links a phantom reference object to the phantom reference object's referent. For instance, in the example context of FIG. 5, if reference object 506 is a soft reference object, the reference that links reference object 506 to standard object 508 (i.e., the referent of reference object 506) may be referred to as a "soft reference."

In an embodiment, a memory area 500 includes dereferenceable reference object(s), and/or the memory area 500 includes non-dereferenceable reference object(s). As used herein, a "dereferenceable reference object" refers to a reference object that (a) is exposed at a program level and (b) can be leveraged by a program instance to access the reference object's referent. A reference object typically will declare a get( ) method, and a program instance may attempt to dereference that reference object by calling the get( ) method. In the example illustrated by FIG. 5, reference object 506 is a dereferenceable reference object, or reference object 506 is a non-dereferenceable reference object. If reference object 506 is dereferenceable, then standard object

508 and standard object 510 are accessible to a program instance; however, if reference object 506 is non-dereferenceable, then standard object 508 and standard object 510 are not accessible to a program instance. Reference object 506 is dereferenceable if (a) reference object 506 is a weak reference object or a soft reference object, and (b) reference object 506 has not been cleared. Note that, in this scenario, calling the get( ) method will return the referent of reference object 506 (i.e., standard object 508). In contrast, if reference object 506 has been cleared, reference object 506 is non-dereferenceable, and calling the get( ) method of reference object 506 will return null. Alternatively, if reference object 506 is a phantom refence object, reference object 506 is non-dereferenceable starting from the moment reference object 506 is instantiated. Phantom reference objects also possess a get( ) method; however, a get( ) method offered by a phantom reference object is generally configured to return null starting from the moment the phantom reference object is instantiated. Thus, phantom reference objects are generally non-dereferenceable. However, note that while a get( ) method of a phantom reference object is often configured to return null, a get( ) method of a phantom reference object can be configured to return the phantom reference object's referent. Accordingly, in some cases, a phantom reference object may be dereferenceable. Final reference objects are not exposed at a program level; therefore, final reference objects are also non-dereferenceable. Note that above discussion in this paragraph refers generally to the behavior of standard soft reference objects, standard weak reference objects, standard final reference objects, and standard phantom reference objects. The behavior of a modified reference object (e.g., a modified soft reference object) or a custom reference object may differ.

In an embodiment, a memory area 500 includes non-strong reference(s), and/or memory area 500 includes strong reference(s). A "non-strong reference" is the special type of reference that is created by a reference object. In particular, a non-strong reference is the reference that links a reference object to the reference object's referent. The non-strong reference that is created by a reference object is held by an object field of the reference object known as the "referent field." References other than non-strong references are identified as "strong references." Strong references are "strong" in the sense that a strong reference to a runtime object may prevent that runtime object from being collected by a garbage collection process in some circumstances. Note that strong references are presented in FIG. 5 as double-lined arrows (e.g., =>), and non-strong references are represented in FIG. 5 as single-lined arrows. As used herein, a runtime object that holds a strong reference to another runtime object is said to "strongly refer" to the other runtime object, a soft reference object is said to "softly refer" to the soft reference object's referent, and a weak reference object is said to "weakly refer" to the weak reference object's referent.

In an embodiment, a memory area 500 includes reachable runtime object(s), and/or memory area 500 includes unreachable runtime object(s). Examples of a reachable runtime object include a strongly reachable object, a softly reachable object, a weakly reachable object, a finalizably reachable object, a phantom reachable object, and others. Note that the term "reachable" does not necessarily imply that a runtime object is accessible to a program instance. In the example illustrated by FIG. 5, root object 502, standard object 504, reference object 506, and standard object 508 are reachable. If reference object 506 is a phantom reference object, standard object 510 is unreachable; otherwise, standard object 510 is reachable in some manner. Standard object 512 is inaccessible to a program instance; however, standard object 512 is not necessarily unreachable. For instance, standard object 512 might be finalizably reachable. Recall that (a) FIG. 5 is limited to depicting references and runtime objects that are exposed at a program level, and (b) final references are not exposed at a program level.

In an embodiment, a memory area 500 includes strongly reachable runtime object(s). As used herein, a runtime object is considered "strongly reachable" if that runtime object can be accessed without having to traverse any reference object. In effect, root objects are strongly reachable, and a runtime object other than a root object (e.g., a standard object or a reference object) is strongly reachable if the runtime object is accessible through a chain of strong reference(s) that link the runtime object to a root object. In the example illustrated by FIG. 5, root object 502, standard object 504, and reference object 506 are strongly reachable. As used herein, the term "strong object graph" refers a network of strongly reachable runtime objects. For example, the term "strong object graph" with respect to FIG. 5 collectively refers to root object 502, standard object 504, reference object 506, and the interleaving strong references between those runtime objects.

In an embodiment, a memory area 500 includes softly reachable runtime object(s). As used herein, a runtime object is "softly reachable" if the runtime object (a) is not strongly reachable and (b) is accessible by traversing at least one reference object without having to traverse any weak reference object, final reference object, or phantom reference object. In effect, a runtime object is softly reachable if (a) the runtime object is reachable through a chain of reference(s) that links the runtime object to a root object, (b) the chain of reference(s) includes at least one soft reference, (c) the chain of reference(s) does not include a weak reference, and (d) the runtime object is not strongly reachable. In the example illustrated by FIG. 5, if reference object 506 is a soft reference object, then standard object 508 and standard object 510 are softly reachable. Note that, in this scenario, standard object 510 is softly reachable despite the fact that (a) standard object 510 is not a referent of a soft reference object, and (b) standard object 508 strongly refers to standard object 510.

In an embodiment, a memory area 500 includes weakly reachable runtime object(s). As used herein, a runtime object is referred to as "weakly reachable" if (a) the runtime object is accessible through a weak reference, and (b) the runtime object is neither strongly reachable nor softly reachable. In effect, a runtime object is weakly reachable if (a) the runtime object is accessible through a chain of reference(s) that links the runtime object to a root object, (b) the chain of reference(s) includes at least one weak reference, and (c) the runtime object is neither strongly reachable nor softly reachable. In the example depicted by FIG. 5, if reference object 506 is a weak reference object, then standard object 508 and standard object 510 are weakly reachable.

In an embodiment, a memory area 500 includes finalizably reachable runtime object(s). As used herein, a runtime object is referred to as "finalizably reachable" if the runtime object (a) is neither strongly reachable, softly reachable, nor weakly reachable and (b) is accessible through a chain of reference(s) that includes a final reference. Recall that final reference objects are non-dereferenceable. Therefore, the term "finalizably reachable" is somewhat of a misnomer in the sense that a finalizably "reachable" object is generally inaccessible to a program instance. However, note that a finalizably reachable object is accessible to a garbage collection process. For example, in the context of a multi-thread computing environment, a finalizably reachable runtime object is accessible to a thread that is responsible for executing finalizer methods (referred to as a "finalizer thread"). In an example implementation of memory area 500, a final reference object is instantiated when a finalizable object is instantiated, and the finalizable object is set as the referent of the final reference object. As used herein, a "finalizable object" is a runtime object that possess a defined finalizer method. An instance of a subclass that overrides a finalizer method of a super class (e.g., the finalizer method of the Java Object class) is one example of a finalizable object. A finalizable object may become finalizably reachable through a corresponding final reference object after the finalizable object becomes unreachable through other references. In the example illustrated by FIG. 5, standard object 512 may be finalizably reachable or may become finalizably reachable if standard object 512 is a finalizable object. However, it should also be noted that (a) a finalizably reachable object is not necessarily a finalizable object, and (b) a finalizably reachable object is not necessarily a referent of a final reference object. As an example, consider a referent of a final reference object (i.e., a finalizable object), and assume that the referent is finalizably reachable. In this example, if (a) the referent refers to another runtime object and (b) the other runtime object is not reachable through any other reference, the other runtime object is also finalizably reachable.

In an embodiment, a memory area 500 includes phantom reachable runtime object(s). As used herein, a runtime object is referred to as "phantom reachable" if (a) the runtime object is neither strongly reachable, softly reachable, weakly reachable, nor finalizably reachable, (b) any finalizer associated with the runtime object has already been called, and (c) the runtime object is reachable through one or more phantom references. In general, a phantom reachable object is a runtime object that has been finalized but not yet reclaimed by a garbage collection process. Recall that a phantom reference object is non-dereferenceable. Therefore, the term "phantom reachable" is also somewhat of a misnomer because a phantom "reachable" object is generally not accessible to a program instance. A phantom reachable object is generally not accessible to a program instance because a get method offered by a phantom reference object is typically configured to return null. In the example illustrated by FIG. 5, if reference object 506 is a phantom reference object, and if neither standard object 508 nor standard object 510 are finalizably reachable, then standard object 508 and standard object 510 are phantom reachable.

As used herein, the term "reachability status" refers generally to whether a runtime object is considered strongly reachable, softly reachable, weakly reachable, finalizably reachable, phantom reachable, or unreachable. Note that a runtime object's reachability status corresponds to the strongest form of reachability that the runtime object possesses. As an example, assume that a runtime object is strongly reachable through one chain of references, and further assume that the runtime object is softly reachable through another chain of references. In this example, the runtime object's is considered strongly reachable rather than softly reachable. The relative strength of reachability statuses, from strongest to weakest, is (a) strongly reachable, (b) softly reachable, (c) weakly reachable, (d) finalizably reachable, and (e) phantom reachable. Note that the reference objects described in this Section 2.4 do not represent an exhaustive list of reference objects. For instance, another example of a reference object is a native weak reference object. Reachability through a native weak reference object is considered of equal strength to phantom reachability. However, unlike a phantom reference object, a native weak reference object is generally dereferenceable.

In an embodiment, the reachability status of any given runtime object residing in a memory area 500 may change. For instance, the reachability status of a runtime object may be downgraded, and/or the reachability status of a runtime object may be upgraded. As used herein, the term "resurrection" refers to an upgrade to a runtime object's reachability status. For example, a runtime object that is merely softly reachable or weakly reachable is said to be "resurrected" if that runtime object subsequently becomes strongly reachable. Softly reachable objects and weakly reachable objects are examples of runtime objects that can be resurrected. Note the resurrection of one runtime object may trigger the resurrection of another runtime object. As an example, assume that reference object 506 is a soft reference object or a weak reference object. Recall that a reference object that is a soft reference object or a weak reference object will typically declare a get( ) method, and calling the get( ) method may return the reference object's referent if the reference object has not been cleared. Note that an operation that involves a successful invocation of a get( ) method of a reference object will typically create a new strong reference to the reference object's referent, and the new strong reference generally will render the referent strongly reachable, at least temporarily. Thus, in this example, if a get( ) method of reference object 506 is successfully invoked (i.e., the get( ) method does not return null), standard object 508 and standard object 510 may both become strongly reachable (and therefore ineligible for collection by a garbage collection cycle). A finalizably reachable runtime object is another example of a runtime object that can be resurrected. As an example, assume that standard object 512 is a finalizably reachable object. In this example, executing the finalizer method targeting standard object 512 may temporarily render standard object 512 strongly reachable by creating a temporary strong reference to standard object 512 that originates from outside of memory area 500. However, note that if standard object 512 subsequently reverts back to being not reachable in this example (as might be expected in the example depicted by FIG. 5), the corresponding finalizer method will not be called again to resurrect standard object 512 a second time.

3. GARBAGE COLLECTION SYSTEM

Figure 6:
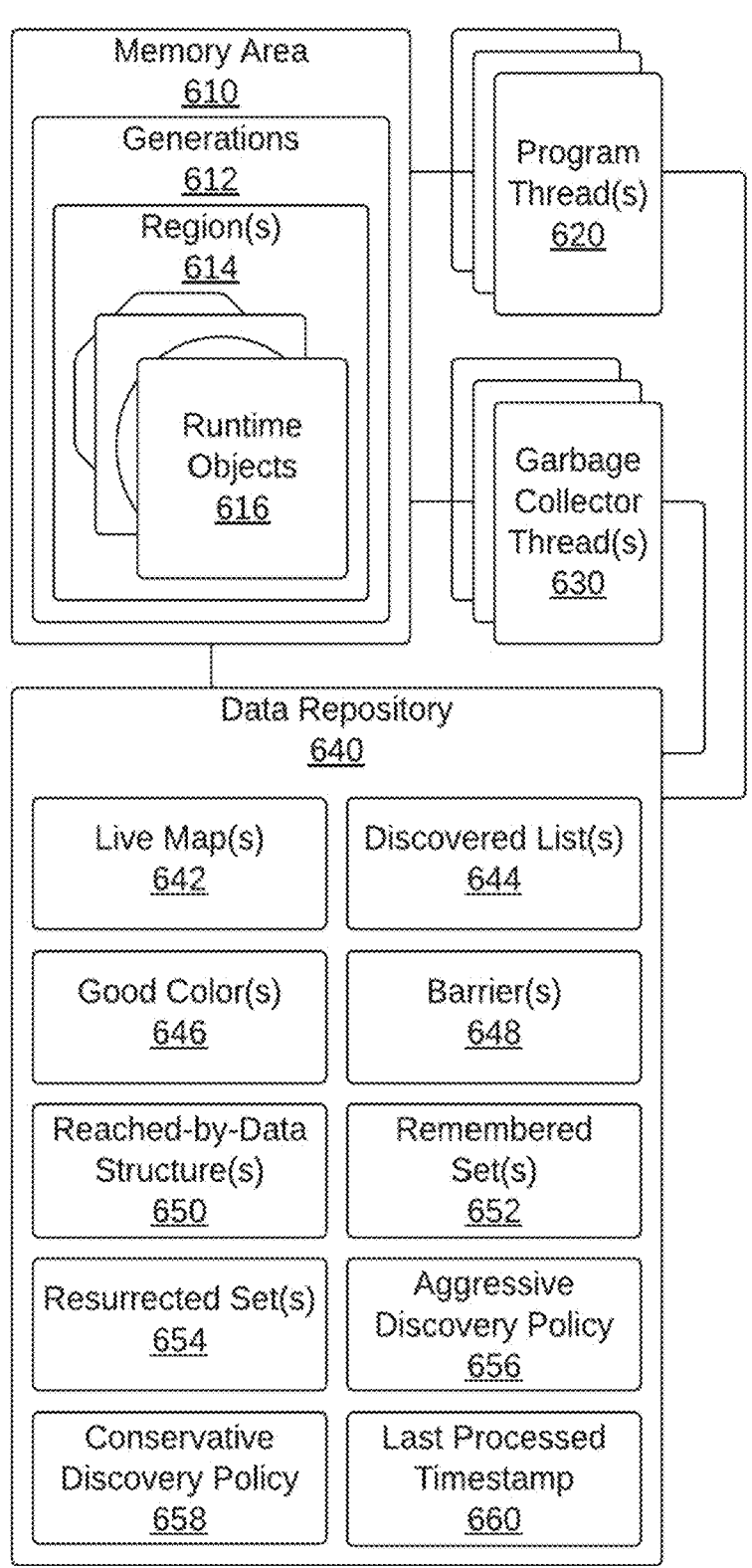
FIG. 6 illustrates a garbage collection system according to an embodiment.

FIG. 6 illustrates a system 600 for performing techniques described herein in accordance with one or more embodiments. As illustrated in FIG. 6, system 600 includes memory area 610, program thread(s) 620, garbage collector thread(s) 630, and data repository 640. In one or more embodiments, system 600 may include more or fewer components than the components illustrated in FIG. 6. The components illustrated in FIG. 6 may be local to or remote from each other. The components illustrated in FIG. 6 may be implemented in software and/or hardware. Each component may be distributed over multiple applications and/or machines. Multiple components may be combined into one application and/or machine. Operations described with respect to one component may instead be performed by another component.

In an embodiment, system 600 refers to hardware and/or software configured to perform a garbage collection process. During the garbage collection process, the system 600 is configured to complete garbage collection cycle(s). A garbage collection cycle that is performed by system 600 may include multiple phases of collection operations. As used herein, the term "collection operation" may refer to any operation that is performed in furtherance of a garbage collection process, and the term "program operation" may refer to any operation other than a collection operation. An example garbage collection cycle includes a marking phase, a reference processing phase, a selection phase, a relocation phase, and/or other phases. As used herein, the term "marking operation" refers to a collection operation that occurs during a marking phase, the term "reference processing operation" refers to a collection operation that occurs during a reference processing phase, the term "selection operation" refers to a collection operation that occurs during a selection phase, and the term "relocation operation" refers to a collection operation that occurs during a relocation phase. Note that any given phase of a garbage collection cycle may be a concurrent phase, and system 600 is capable of performing multiple concurrent garbage collection cycles in the same memory area at the same time. Accordingly, system 600 is configured to perform one concurrent phase while system 600 is also performing other concurrent phase(s) at the same time. Additional embodiments and/or examples related to a garbage collection cycle are described below in Section 4 titled "Garbage Collection Cycle."

Additional embodiments and/or examples relating to performing a garbage collection process are described within R01333NP and R01333N2. R01333NP and R01333N2 are incorporated by reference in entirety as if set forth herein.

In an embodiment, memory area 610 is any type of storage unit and/or device (e.g., a file system, database, collection of tables, or any other storage mechanism) for storing data. Furthermore, memory area 610 may include multiple different storage units and/or devices. The multiple different storage units and/or devices may or may not be of the same type or located at the same physical site. Memory area 610 is implemented or executed on the same computing system as other components of system 600, and/or memory area 610 is implemented or executed on a computing system that is separate from other components of system 600. Memory area 610 is communicatively coupled to other component(s) of system 600 via physical link(s), and/or data repository 640 is communicatively coupled to other component(s) of system 600 via wireless link(s). Memory area 610 may include volatile memory, and/or memory area 610 may include non-volatile memory.

In an embodiment, memory area 610 is allocated for runtime memory of a single program instance, or memory area 610 is allocated for runtime memory of multiple program instances. The program instance(s) may be implemented, in whole or in part, using one or more class-based, object-oriented programming languages. Examples of class-based, object-oriented programming languages include Java, C++, C#, Python, Ruby, and others. In the example context of virtual machine memory layout 300 as illustrated in FIG. 3, memory area 610 may reside in heap 302, and runtime objects 616 may be manifested as instances of reference types (e.g., classes) that are instantiated during the runtime of at least one program instance. This implementation of memory area 610 in the context of class-based, object-oriented program language(s) is described herein for illustrative purposes and is not intended to define any limits to the disclosure. It should be understood that the techniques described herein are equally applicable to other contexts and computing environments.

In an embodiment, memory area 610 is organized into multiple generations 612. A generation 612 is a section of memory area 610 that is used to organize information stored to memory area 610. An example generation 612 is a logical subdivision of memory area 610. Note that a logical subdivision of memory area 610 need not be associated with any spatial boundaries within memory area 610. A runtime object 616 may be organized into a generation 612 based on temporal attributes, reachability status, type, and/or other characteristics. Example temporal attributes of a runtime object 616 include time elapsed since the runtime object 616 was created, time elapsed since the runtime object 616 was last accessed, time elapsed in relation to the creation or use of another runtime object 616, and others. In an example, memory area 610 includes a young generation, and memory area 610 includes an old generation. Note that the boundaries of a generation 612 are not necessarily demarcated based on any temporal attributes of runtime objects 616.

In an embodiment, memory area 610 includes a young generation 612, and memory area 610 includes an old generation 612. A runtime object 616 may be organized into either the young generation 612 or the old generation 612 based on temporal attribute(s) of the runtime object 616. As the names of the young generation 612 and the old generation 612 suggest, younger runtime objects 616 reside in the young generation 612, and older runtime object 616 reside in the old generation 612. When a runtime object 616 is first instantiated, that runtime object 616 is organized into the young generation 612. If enough time elapses without a runtime object 616 being collected from the memory area 610, that runtime object 616 is promoted to the old generation 612. As used herein, the term "young object" refers to a runtime object residing in a young generation, and the term "old object" refers to a runtime object residing in an old generation. Note that during a garbage collection process, one garbage collection cycle may be occurring in the young generation 612 while another garbage collection cycle is occurring in the old generation 612. It should also be noted that during a garbage collection process, runtime objects 616 may be moving from the young generation 612 to the old generation 612. In other embodiments, memory area 610 includes more generations 612, or memory area 610 includes fewer generations 612. In an example of the former scenario, memory area 610 may include multiple old generations 612, and/or memory area 610 may include multiple old generations 612. Furthermore, in other embodiments, memory area 610 includes generations 612 that are demarcated based on criteria that is additional or alternative to any temporal characteristics of runtime objects 616 residing in the memory area 610.

In an embodiment, information stored to memory area 610 is organized into region(s) 614. A region 614 is a basic unit of memory allocation within memory area 610 that may be independently managed during a garbage collection cycle. For example, during a garbage collection cycle, an individual region 614 may be selected as a candidate region for relocation operations.

In an embodiment, runtime objects 616 includes root object(s), standard object(s), reference object(s), and/or other types of runtime objects 616. If a runtime object 616 is a reference object, the runtime object 616 is a soft reference object, a weak reference object, a final reference object, a phantom reference object, or another type of reference object. A runtime object 616 may refer to another runtime object 616 residing in memory area 610. If a runtime object 616 refers to another runtime object 616, the runtime object 616 refers to a single other runtime object 616, or the runtime object 616 refers to multiple other runtime objects 616. A runtime object 616 residing in memory area 610 is exposed at a program level, or the runtime object 616 is not exposed at the program level (e.g., a final reference object).

In an embodiment, a runtime object 616 is a soft reference object, and the soft reference object is associated with a last used timestamp. The last used timestamp corresponds to when the soft reference object was last used by a program instance to access the soft reference object's referent. The last used timestamp is maintained in a private field of the soft reference object, and/or the last used timestamp is maintained in a separate location.

In an embodiment, a runtime object 616 residing in memory area 610 is eligible for collection by a garbage collection process, or the runtime object 616 is ineligible for collection by a garbage collection process. As used herein, the term "disposable" refers to eligibility for collection by a garbage collection process, and the term "non-disposable" refers to ineligibility for collection by a garbage collection process. Note that a runtime object 616 that is deemed to be disposable during a garbage collection cycle is not necessarily collected by that garbage collection cycle. In an example, a garbage collection cycle targeting memory area 610 reclaims the memory that is occupied by the disposable runtime objects 616 residing in a subset of the regions 614 within memory area 610. Thus, disposable runtime objects 616 not residing in the subset of the regions 614 are not collected during the garbage collection cycle of this example.

In an embodiment, a runtime object 616 is a strongly reachable object, a softly reachable object, a weakly reachable object, a finalizably reachable object, a phantom reachable object, or an unreachable object. A runtime object's 616 eligibility for collection during a garbage collection cycle may depend upon the runtime object's 616 reachability status and/or other factors. For example, strongly reachable objects are typically considered non-disposable; whereas unreachable objects are typically considered disposable. A runtime object that is reachable but less than strongly reachable may be considered disposable or non-disposable depending on the circumstances. Note that, in some cases, a runtime object 616 may be treated as strongly reachable (and therefore non-disposable) regardless of whatever that runtime object's 616 actual reachability status may be. As an example, assume that memory area 610 includes a young generation 612 and an old generation 612, and further assume that a runtime object 616 residing in the old generation 612 (i.e., an old object) holds a reference to another runtime object 616 residing in the young generation 612 (i.e., a young object). In this example, the reference from the old object to the young object is treated as a root of the young generation 612, and the young object is treated as strongly reachable regardless of whatever the young object's actual reachability status may be. It could be that the young object is actually unreachable in this example. It should also be noted that that the criteria for distinguishing between disposable runtime objects 616 and non-disposable runtime objects 616 may vary between garbage collection cycles occurring in memory area 610.

In an embodiment, a runtime object 616 is a live object, or the runtime object 616 is a dead object. As used herein, the term "live object" refers to a runtime object that is marked as live in at least one record of state information, and a "dead object" refers to a runtime object that has not been marked as live. A runtime object 616 marked as live during a garbage collection cycle is generally not collected by that garbage collection cycle. On the other hand, a runtime object 616 that is not marked as live during a garbage collection cycle (i.e., a dead object) may or may not be collected by that garbage collection cycle. Note that a runtime object 616 may be a live object during one garbage collection cycle, and the runtime object 616 may be a dead object during a subsequent garbage collection cycle.

As illustrated in FIG. 6, system 600 may be implemented, at least in part, using a multi-thread computing system. A multi-thread computing system is one example of a computing system capable of performing concurrent operations. The implementation of system 600 in the context of a multi-thread computing system is described herein for illustrative purposes and is not intended to define any limits to this disclosure. It should be understood that techniques herein are equally applicable to other computer architectures. For instance, the techniques described herein may be applicable to any computer architecture that is capable of concurrency.

In an embodiment, program thread(s) 620 are execution environment(s) for machine-level instructions. A program thread 620 is primarily allocated for performing the machine-level code of a program instance. Accordingly, a program thread 620 generally performs program operations. Note that when a program thread 620 is performing the machine-level code of a program instance, runtime objects 616 that are not exposed at a program level (e.g., final reference objects) are inaccessible to that program thread 620 because the machine-level code of the program instance is unable to describe resources that are not exposed at a program level. While a program thread 620 generally performs program operations, the program thread 620 may be further configured to execute machine-level code of a garbage collection process (i.e., collection operations). In particular, a program thread 620 can be made to perform collection operations by imposing a barrier 648 (e.g., a load barrier or a store barrier) on that program thread 620. As used herein, the term "barrier" refers to an additional set of machine-level instructions inserted into the machine-level code that is performed by an execution environment. In the example context of execution platform 112 as illustrated in FIG. 1, a barrier is imposed on a program thread 620 when JIT compiler 109 inserts the machine-level instructions defined by the barrier into the machine-level code of the program instance that is being performed by that program thread 620.

In an embodiment, garbage collector thread(s) 630 are execution environment(s) for machine-level instructions. A garbage collector thread 630 is configured for performing machine-level code of a garbage collection process. Accordingly, a garbage collector thread 630 primarily performs collection operations. Note that a garbage collector thread 630, while performing a collection operation, may access information that is not exposed at a program level. For example, a garbage collector thread 630 may access final reference objects, and a garbage collector thread 630 may traverse final references to access finalizably reachable objects.

In an embodiment, garbage collector thread(s) 630 are configured to perform collection operations while program thread(s) 620 are concurrently performing program operations. For instance, while a program thread 620 is performing program operations, a garbage collector thread 630 may be performing marking operations, reference processing operations, selection operations, relocation operations, and/or other collection operations. Recall that a program thread 620 may perform collection operations pursuant to a barrier. Note that a program thread 620 may perform a collection operation pursuant to a barrier while another program thread 620 is concurrently performing a program operation. It should also be noted that the term "garbage collector" is used herein to refer broadly to any execution environment that is performing a collection operation. Thus, in example context of system 600 as illustrated in FIG. 6, the term "garbage collector" may be used herein to identify a program thread 620 performing a collection operation, and the term "garbage collector" may be used herein to identify a garbage collector thread 630 performing a collection operation.

In an embodiment, program thread(s) 620 and garbage collector thread(s) 630 are configured to generate and/or update records of state information while performing collection operations. Stated differently, a garbage collector is configured to generate records of state information. Example records of state information include a live map 642, a discovered list 644, a colored pointer, a reached-by-data structure 650, a remembered set 652, a resurrected set 654, and others. As used herein, the term "marking" refers generally to recording state information. For example, during a marking phase a garbage collector "marks through" runtime objects 616 residing in memory area 610 to generate records of state information. However, note that a garbage collector may record state information (e.g., by marking through runtime objects 616) throughout a garbage collection cycle (e.g., during a reference processing phase, a selection phase, a relocation phase, etc.). It is also worth noting here that the term "marking operation" does not necessarily refer to marking through a runtime object 616. Recall that the term "marking operation" refers to any collection operation (marking or otherwise) that occurs during a marking phase. A garbage collector may perform operations during a marking phase that do not entail writing to a record of state information. Thus, the term "marking operation" does not necessarily identify an operation that entails recording state information.

In an embodiment, a data repository 640 is any type of storage unit and/or device (e.g., a file system, database, collection of tables, or any other storage mechanism) for storing data. Furthermore, a data repository 640 may include multiple different storage units and/or devices. The multiple different storage units and/or devices may or may not be of the same type or located at the same physical site. Furthermore, a data repository 640 may be implemented or executed on the same computing system as other components of system 600. Additionally, or alternatively, a data repository 640 may be implemented or executed on a computing system separate from other components of system 600. The data repository 640 may be communicatively coupled to other components of system 600 via a direct connection or via a network.

As illustrated in FIG. 6, a data repository 640 may include live map(s) 642, discovered list(s) 644, good color(s) 646, barrier(s) 648, reached-by-data structure(s) 650, remembered set(s) 652, resurrected set(s) 654, aggressive discovery policy 656, conservative discovery policy 658, last processed timestamp 660, and/or other information. Information describing live map(s) 642, discovered list(s) 644, good color(s) 646, barrier(s) 648, reached-by-data structure(s) 650, remembered set(s) 652, resurrected set(s) 654, aggressive discovery policy 656, conservative discovery policy 658, and last processed timestamp 660 may be implemented across any of the components within system 600 (those illustrated in FIG. 6 or otherwise). However, this information is illustrated within data repository 640 for purposes of clarity and explanation.

In an embodiment, a live map 642 records the state of runtime object(s) 616 residing in memory area 610. An example live map 642 is a bit map that indicates (a) if a runtime object 616 is live, (b) if the runtime object 616 is strongly reachable, and/or (c) other state information of the runtime object 616. A live map 642 may describe the state of runtime objects 616 throughout memory area 610, the state of runtime objects 616 residing in a particular generation 612 of memory area 610, the state of runtime objects 616 residing in a particular region 614 of memory area 610, and/or the state of runtime objects 616 residing in some other subdivision of memory area 610. If a runtime object 616 is marked as live and/or strongly reachable in a live map 642 during a garbage collection cycle, that runtime object 616 is typically treated as non-disposable for the remainder of that garbage collection cycle. Based on a live map 642, a garbage collector may (a) determine whether or not a reference object should be cleared, (b) select a candidate region 614 to be subjected to relocation operations, (c) identify a runtime object 616 that should be relocated, (d) identify a runtime object 616 that should be collected, and/or (e) perform other collection operations. Whether or not a runtime object 616 is marked as live in a live map 642 may depend on the runtime object's reachability status. In an example, a runtime object 616 is marked as live in a live map 642 if that runtime object is strongly reachable or finalizably reachable. Note that in this example, a finalizably reachable object may need to be retained in memory area 610 until the corresponding finalizer method has been executed. Additionally, or alternatively, the runtime object 616 of this example may be marked as live if that runtime object 616 is softly reachable. Note that whether or not a softly reachable object is marked as live may depend on various factors (e.g., a discovery policy, memory pressure, etc.). If the runtime object 616 is phantom reachable in this example, the runtime object 616 is not marked as live in the live map 642. However, it should be noted that (a) factors other than a runtime object's 616 reachability status may control whether or not the runtime object 616 is marked as live and/or strongly reachable in a live map 642, and (b) a runtime object 616 being marked as live in a live map 642 is not necessarily a reliable indicator of the runtime object's 616 actual state. If a garbage collector discerns any reason for a runtime object 616 to be exempted from collection, the garbage collector may designate that runtime object 616 as live and/or strongly reachable in a live map 642 regardless of whatever the runtime object's 616 actual reachability status may be.

In an embodiment, a discovered list 644 is a list of reference object(s) that may be eligible for reference processing. A discovered list 644 may include soft reference objects, weak reference objects, final reference objects, phantom reference objects, and/or other reference object. In an example, a discovered list 644 is generated by a garbage collector during a marking phase while the garbage collector is marking through (a) strongly reachable objects and (b) finalizably reachable objects. In general, a reference object may be eligible for reference processing if the reference object's referent is not strongly reachable. However, note that whether or not a reference object is added to a discovered list 644 may depend on various factors. As an example, consider a reference object and a referent that reside in the same generation 612 of memory area 610, and assume that the referent is not strongly reachable. In this example, whether or not the reference object is added to a discovered list 644 may depend on (a) the reference object's reachability status, (b) a discovery policy that is being applied (e.g., an aggressive discovery policy 656, a conservative discovery policy 658, etc.), (c) memory pressure in memory area 610, (d) the type of reference object, (e) the particular generation 612 that the reference object and the referent reside in, (f) how recently that reference object has been used to access the referent, and/or (g) other factors.

In an embodiment, a good color 646 is a value that is used for coloring pointers that refer to runtime objects 616. Recall that "coloring a pointer" refers to embedding metadata into bit(s) within the pointer that are not being used for storing an address of a location in memory. For example, a garbage collector may color a pointer by embedding a good color 646 into bits within the pointer that are not being used for storing an address associated with a runtime object 616. Note that a reference to a runtime object 616 may be implemented in low-level memory, at least in part, using a pointer. In general, a garbage collector colors pointers to record state information of the pointers and/or runtime objects 616 that are referred to by the pointers. Good colors 646 may be stored to global variables, stored to thread-local variables, encoded into barriers 648, and/or maintained in any other location that is readily accessible to a program thread 620 and/or a garbage collector thread 630. Note that, during a garbage collection cycle, a garbage collector may determine new good colors 646. For example, a garbage collector may determine new good colors 646 to track a new phase of a garbage collection cycle. When a garbage collector determines new good colors 646, the previous good colors 646 become bad colors. Additional embodiments and/or examples related to pointer coloring are described below in Section 5 titled "Colored Pointer Architecture."

In an embodiment, a barrier 648 is additional set of machine-level instructions that is inserted into the machine-level code that is performed by an execution environment. Barriers 648 may be imposed on program threads 620, garbage collector threads 630, and/or other execution environments. By imposing a barrier 648 on a thread, system 600 compels that thread to perform additional operations. For example, the system 600 temporarily commandeers a program thread 620 for performing collection operations by imposing a barrier 648 on that program thread 620. The system 600 often imposes barriers on program threads 620 during concurrent phases. In addition to serving other purposes, the collection operations required by the barriers imposed on program threads 620 contribute to system 600 preventing concurrency issues that might otherwise occur due to program threads 620 performing program operations in the memory area 610 during a concurrent phase. Example barriers include load barriers, store barriers, and others. A load barrier is a barrier 648 that is imposed on a thread that is attempting a load operation in memory area 610. An example load operation is a request by a program instance for a program thread 620 to read a reference that is carried in an object field of a runtime object 616. An example load barrier specifies collection operations that a program thread may be required to perform before and/or after a load operation. A store barrier is a barrier 648 that is imposed on a thread that is attempting to a store operation in memory area 610. An example store operation is a request by a program instance for a program thread 620 to store a reference to an object field of a runtime object 616. An example store barrier specifies collection operations that a program thread may be required to perform before and/or after a store operation. Example collection operations that may be performed by a program thread pursuant to a store barrier 648 include (a) adding an entry to a store barrier buffer, (b) adding an entry to a remembered set 652, (c)

relocating a runtime object, (d) remapping a pointer, (e) coloring a pointer, (f) adding an entry to the marking stack of a garbage collector thread 630, and/or (g) others. Note that logic defined in barriers 648 use the metadata that is embedded into colored pointers for determining appropriate collection operations to be performed in response to a given program operation.

In an embodiment, a reached-by-data structure 650 records state information of a runtime object 616 that could potentially be resurrected during a garbage collection cycle. In particular, a reached-by-data structure 650 records state information associated with a runtime object 616 that can be used to update other records of state information (e.g., a live map 642, a discovered list 644, colored pointers, a remembered set 652, etc.) in the event that the runtime 616 is resurrected. Recall that the term "resurrection" refers to an upgrade to a runtime object's 616 reachability status. For example, a resurrection occurs when a runtime object 616 that was formerly softly reachable, weakly reachable, finalizably reachable, phantom reachable, or unreachable becomes strongly reachable.

In an embodiment, a remembered set 652 is a list of object fields that hold references that potentially cross generational boundaries within memory area 610. For example, an object field of a runtime object 616 may be added to remembered set 652 if (a) that runtime object resides in an old generation 612 of the memory area 610 and (b) the field holds a reference to another runtime object 616 that potentially resides in a young generation 612 of the memory area 610. Note that a cross-generational reference is generally treated as a root. In an example, a program thread adds an object field of a runtime object 616 to a remembered set 652 while performing a store barrier. In this example, the program thread 620 is made to perform the store barrier due to a program instance requesting that a new reference be stored to the object field of the runtime object 616.

In an embodiment, a resurrected set 654 is a list of resurrections. A resurrected set 654 is used by a garbage collector to identify resurrections that occurred during a termination procedure for a concurrent marking phase. Based on a resurrected set 654, a garbage collector can identify any reached-by-data structures 652 that will be needed to update other records of state information in view of any resurrections that occurred during a termination procedure. Note that a resurrected set 654 can be used by a program thread 620 executing a load barrier to determine if a runtime object 616 was resurrected during a termination procedure even if the system 600 has not yet updated other records of state information (e.g., a live map 642) to reflect the resurrection. An example resurrected set 654 is a list of reference objects that are used to resurrect the reference object's referents during a termination procedure for a concurrent marking phase of a garbage collection cycle. The example resurrected set 654 is generated by at least one program thread 620 while executing a barrier.

In an embodiment, a discovery policy (e.g., aggressive discovery policy 656 and conservative discovery policy 658) defines rule(s) for the treatment of a runtime object 616 while generating a record of state information (e.g., a live map, a discovered list, a colored pointer, a reached-by-data structure, etc.). An example discovery policy dictates how a garbage collector treats soft reference objects while generating a discovered list 644, and the example discovery policy may dictate if softly reachable objects are marked as live in a live map 642. Any given record of state information is generated in accordance with no discovery policy, a single discovery policy, or multiple discovery policies.

In an embodiment, aggressive discovery policy 656 defines rule(s) for the treatment of a soft reference object while marking through the soft reference object. In particular, aggressive discovery policy 656 dictates how a soft reference object should be treated while generating a discovered list 644, a live map 642, and/or other data structures. Additionally, or alternatively, aggressive discovery policy 656 defines rules for the treatment of other types of runtime objects 616. Aggressive discovery policy 656 is "aggressive" in the sense that applying aggressive discovery policy 656 tends to result in more runtime objects 616 being collected from memory area 610 on aggregate.

In an embodiment, aggressive discovery policy 656 dictates that a garbage collector treats a soft reference object residing in memory area 610 as a weak reference object while generating a discovered list 644. Note that a garbage collector that encounters a weak reference object while marking through strongly reachable runtime objects 610 will generally add that weak reference object to a discovered list 644 if the weak reference object's referent is not strongly reachable. It should also be noted that in this embodiment, aggressive discovery policy 656 does not distinguish between a soft reference object residing in a young generation 612 and a soft reference object residing in an old generation 612.

In an embodiment, conservative discovery policy 658 defines rule(s) for the treatment of a soft reference object while marking through the soft reference object. In particular, conservative discovery policy 658 dictates how a soft reference object should be treated while generating a discovered list 644. Additionally, or alternatively, conservative discovery policy 658 defines rules for the treatment of a soft reference object while generating other records of state information, and/or conservative discovery policy 658 defines rules for the treatment of other runtime objects 616. Conservative discovery policy 658 is "conservative" in the sense that applying conservative discovery policy 658 tends to result in fewer runtime objects 616 being collected from memory area 610.

In an embodiment, conservative discovery policy 658 dictates that a soft reference object is treated as a weak reference object while generating a discovered list 644, or conservative discovery policy 658 dictates that the soft reference object is treated as a standard object while generating a discovered list 644. Note that a garbage collector that encounters a weak reference object while marking through strongly reachable runtime objects 610 will generally add that weak reference object to a discovered list 644 if the weak reference object's referent is not strongly reachable. Further note that standard objects are not added to a discovered list 644. If conservative discovery policy 658 dictates that a soft reference object is to be treated as a standard object (and therefore exempted from inclusion in a discovered list 644), the conservative discovery policy 658 may further require a garbage collector to mark runtime objects 616 that are softly reachable through the soft reference object as live in a live map 642.

In an embodiment, conservative discovery policy 658 defines one set of rules for the treatment of soft reference objects residing in a young generation 612, and conservative policy 658 defines another set of rules for the treatment of soft reference objects residing in an old generation 612. If a soft reference object resides in the young generation 612, conservative discovery policy 658 dictates that the soft reference object is treated as a standard object while generating a discovered list 644. On the other hand, if a soft reference object resides in the old generation 612, conservative discovery policy 658 dictates that the soft reference object is either treated as (a) a weak reference object or (b) a standard object. As an example, consider a soft reference object residing in the old generation 612, and assume that the soft reference object's referent also resides in the old generation 612. In this example, the soft reference object is treated as a weak reference object if the soft reference object has not recently been utilized to access the soft reference object's referent. Conversely, in this example, if the soft reference object has been recently used to access the soft reference object's referent, the soft reference object is treated as a standard object. Note that in other examples, conservative discovery policy's 658 criteria for selecting an appropriate treatment for a soft reference object may differ.

In an embodiment, last processed timestamp 660 tracks when reference processing last occurred in a specific generation 612 of memory area 610. Last processed time stamp 660 may be stored to a global variable, stored to a thread-local variable, encoded into a barrier 648, and/or maintained in any other location that is generally accessible to a program thread 620 and/or a garbage collector thread 630. In an example, last processed timestamp 660 tracks when a reference processing last occurred in an old generation 612 of memory area 610. Therefore, in this example, last processed timestamp 660 is not updated when a reference processing occurs in the young generation 612. However, in this example, last processed timestamp 660 is updated when reference processing occurs in the old generation 612.

4. GARBAGE COLLECTION CYCLE

Figure 7:
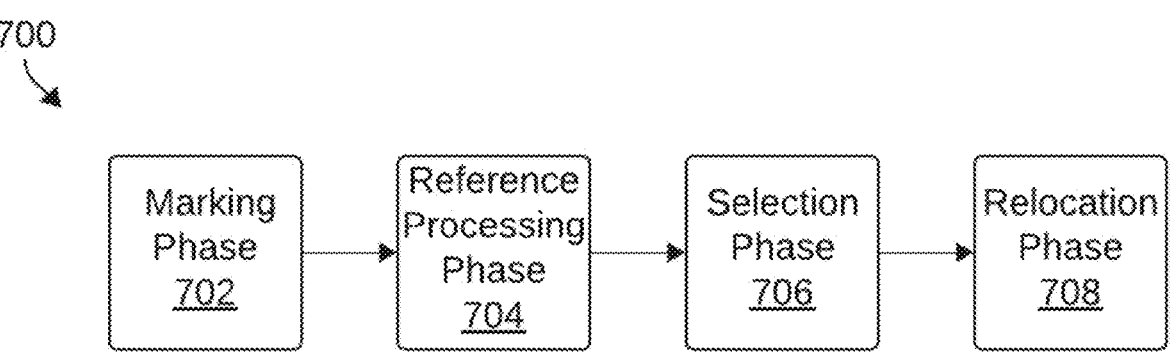
FIG. 7 illustrates a garbage collection cycle in block diagram form according to an embodiment.

FIG. 7 illustrates an example architecture for a garbage collection cycle 700 in accordance with one or more embodiments. As illustrated in FIG. 7, garbage collection cycle 700 may include marking phase 702, reference processing phase 704, selection phase 706, and relocation phase 708. In one or more embodiment, garbage collection cycle 800 may include more or fewer phases than the phases illustrated in FIG. 7, and/or one or more phases illustrated in FIG. 7 may be modified, rearranged, or omitted all together. Accordingly, the particular sequence of operations illustrated in FIG. 7 should not be construed as limiting the scope of one or more embodiments. Furthermore, it should be understood that a garbage collection 700 may include collection operations that do not occur during any particular phase of the garbage collection cycle 700. For example, collection operations may occur before, after, and/or in between phases of a garbage collection cycle 700.

In an embodiment, garbage collection cycle 700 is a concurrent garbage collection cycle. Therefore, at least one phase of garbage collection cycle 700 (e.g., marking phase 702, reference processing phase 704, selection phase 706, relocation phase 708, etc.) is a concurrent phase. During an example concurrent phase of garbage collection cycle 700, a garbage collector thread is performing collection operations in a memory area while at least one program thread is simultaneously enabled to perform program operations in the memory area. If left unchecked, program operations interfering with collection operations during a concurrent phase can result in concurrency issues such as race conditions, live lock, data corruption, memory loss, termination indeterminism, and other problems. In general, the system prevents concurrency issues from arising during a concurrent phase of garbage collection cycle 700 using a combination of a monotonic state machine, pointer coloring, barriers, reached-by-data structures, a resurrected set, and other mechanisms.

In an embodiment, garbage collection cycle 700 includes a marking phase 702. During the marking phase 702, the system marks through runtime objects residing in a memory area to collect state information. While marking through the runtime objects, the system generates records of state information that will be used in subsequent phases of the garbage collection cycle 700 as a basis for collecting runtime objects from the memory area, retaining runtime objects in the memory area, reorganizing the memory area, and/or other collection operations. Example records of state information that may be generated during the marking phase 702 include live maps, discovered lists, colored pointers, reached-by-data structures, remembered sets, resurrected sets, and others. In addition to generating records of state information, the system may perform other marking operations during the marking phase 702. For example, if the system encounters a broken pointer while marking through a runtime object, the system repairs the broken pointer by remapping the broken pointer to the correct address. The system may continue to repair broken pointers that are encountered by the system throughout garbage collection cycle 700.

In an embodiment, marking phase 702 is performed in accordance with a discovery policy that is selected by the system. A discovery policy that the system selects may impact how runtime objects residing in the memory area are treated with respect to one or more records of state information. The system selects a single discovery policy, or the system selects multiple discovery policies. The system selects a discovery policy to apply specifically in a particular generation, or the system selects a discovery policy to apply in multiple generations. While selecting a discovery policy, the system may consider various inputs. For example, the system may consider conditions within the memory area, conditions within a particular generation of the memory area, characteristics of program instance(s) interacting with the memory area, and other inputs.

In an embodiment, marking phase 702 is a concurrent phase of garbage collection cycle 700. Thus, during marking phase 702, program operations may be manipulating the memory area at the same time as the system is performing marking operations in the memory area. Note that program operations manipulating the memory area may further complicate marking phase 702. For instance, if a program operation alters the reachability status of a runtime object residing in the memory area during marking phase 702, the system may be forced to repeat marking operations, and/or the system may be forced to perform additional marking operations.

In an embodiment, marking phase 702 is a snapshot-at-the-beginning (SATB) marking phase, an incremental marking phase, and/or another type of concurrent marking phase. In an example, marking phase 702 is implemented as an SATB marking phase that is directed to a particular generation of the memory area. As the name suggests, an SATB marking phase begins with the system generating a snapshot of a memory area that is being subjected to a garbage collection cycle. Based on the snapshot, the system of this example identifies root objects residing in the particular generation of the memory area. Note that references pointing into the particular generation from another generation of the memory area are also treated as roots. Treating cross-generational references as roots enables the system to perform garbage collection cycle 700 in isolation of any other garbage collection cycles in the memory area. For instance, if the system did not treat a cross-generational reference as a root, the system might have to acquire state information from a generation other than the particular generation (e.g., by waiting for another marking phase in the other generation to be completed). Starting from the root objects, the system traverses strong references to other strongly reachable objects until no more strongly reachable objects can be found within the particular generation. In addition to marking through the strong object graph of the particular generation in this example, the system marks through runtime objects residing in the particular generation that are reachable but less than strongly reachable. For instance, the system may mark through finalizably reachable objects as finalizably reachable objects may need to be retained in the memory area for a corresponding finalizer method to be successfully executed. Furthermore, while generating reached by data structure(s), the system may mark through other runtime objects that could potentially be resurrected. To this end, the system may mark through a part of the runtime objects that could potentially be resurrected, or the system may mark through all of the runtime objects that could potentially be resurrected. Recall that whether or not a referent of a reference object can be resurrected may depend on whether or not that reference object is dereferenceable. In an example application, soft reference objects, weak reference objects, and native weak reference objects are typically dereferenceable prior to clearing. Therefore, in this example application, a runtime object may be a candidate for marking by the system if that runtime object is reachable through at least one chain of reference(s) that (a) includes a soft reference, a weak reference, and/or a native weak reference and (b) does not include a phantom reference. Note that the system need not traverse the object graph to discover native weak references in this example as a native weak reference is automatically discovered upon creation. It should also be noted that this example does not describe an exhaustive list of reference objects, and recall that reachability through a native weak reference object is considered of equal strength to phantom reachability. Further recall that any reference object may be configured to be dereferenceable or non-dereferenceable. For example, while a get( ) method of a phantom reference object is often configured to return null, a get method( ) of a phantom reference object can be configured to return the phantom reference object's referent. In sum of the foregoing, the reachability status of a runtime object is not necessarily a definitive indicator of whether or not that runtime object is a candidate for marking and the reachability statuses of runtime objects that are candidates for marking may vary between applications. In general, any runtime object that could potentially be resurrected is a candidate for marking during marking phase 702 while the system is generating reached by data structure(s).

In an embodiment, garbage collection cycle 700 includes a reference processing phase 704. During reference processing phase 704, the system processing reference objects residing in the memory area. In particular, the system may process reference object(s) that are included in a discovered list. Examples of reference objects that may be found in a discovered list include soft reference objects, weak reference objects, final reference objects, phantom reference objects, and others. Note that a discovery policy that is applied during marking phase 702 may impact the contents of a discovered list, a live map, and/or other records of state information. It should also be noted that, before processing the reference objects included in a discovered list, the system may update the discovered list during reference processing phase 704. Once any appropriate updates are applied to a discovered list, the system iterates through the discovered list processing the constituent reference objects.

Processing a reference object may entail clearing the reference object, enqueueing the reference object, and/or other reference processing operations. A reference object is cleared by setting the referent field of the reference object to null. Clearing a reference object breaks the non-strong reference that links the reference object to the reference object's referent. Once a reference object has been cleared, the reference object cannot be dereferenced, and, therefore, that reference object can no longer be used to resurrect the reference object's referent. When a reference object is cleared, the reference object's referent will typically become unreachable unless the referent is also referred to by another reference object. Consequently, clearing a reference object typically results in the reference object's referent being collected during the present garbage collection cycle 700 or a subsequent garbage collection cycle. The system may clear any reference object that is included in a discovered list; however, the system may refrain from clearing a final reference object if the final reference object's referent possesses an uncalled finalizer method. Enqueueing a reference object adds the reference object to an appropriate reference queue. Adding a reference object to a reference queue serves to notify any program instance associated with the reference object that the referent has been collected or will soon be collected. Notifying a program instance of a referent being subjected to collection may signal the program instance to take appropriate actions such as performing cleanup operations, logging, and/or other post-mortem processing.

In an embodiment, reference processing phase 704 is a concurrent phase of garbage collection cycle 700. Thus, during reference processing phase 704, program operations may be attempting to manipulate reference objects at the same time that the system is attempting to process those reference objects. Note that a program operation manipulating a reference object might interfere with an attempt to process that reference object. For example, concurrency issues might arise if a program operation is allowed to resurrect a reference object included in a discovered list while the system is attempting to process reference objects in the discovered list.

In an embodiment, garbage collection cycle 700 includes selection phase 706. During selection phase 706, the system generates an evacuation candidate set. The evacuation candidate set contains candidate regions. A candidate region is a region of the memory area that may be targeted by a relocation phase 708 of the garbage collection cycle 700. The system selects a candidate region based on records of state information originally generated during the marking phase (e.g., a live map), and/or the system selects the candidate region based on other information. Example inputs that potentially influence the selection of a candidate region by the system include an occupancy level of the candidate region, a capacity of the candidate region, the amount of live object in the candidate region, the amount of dead objects in the candidate region, and other information. In an example, the system selects a candidate region based on a liveness ratio associated with runtime objects residing in the candidate region. In this example, the system calculates the liveness ratio based on a live map that was generated during the marking phase 702, and the candidate region is selected because the liveness ratio indicates that the candidate region has proportionally fewer live objects relative to other regions.

In an embodiment, garbage collection cycle 700 includes relocation phase 708. During relocation phase 708, the system relocates non-disposable runtime objects residing in the candidate regions that are identified in an evacuation candidate set. The non-disposable runtime objects residing in the candidate regions are relocated to other non-candidate regions of the memory area. In general, a runtime object residing in a candidate region may be relocated if that runtime object is marked as live and/or strongly reachable in a live map and/or another record of state information. When the system relocates a runtime object, the system generates an entry for that runtime object in a forwarding table. An example entry in a forwarding table maps the previous address of a runtime object that formerly resided in a candidate region to a post-relocation address of that runtime object in a non-candidate region. In addition to relocating runtime objects and generating a forwarding table, the system may perform other collections operations while relocating the runtime objects. For example, in addition to relocating a runtime object, the system may remap a pointer that refers to that runtime object to the runtime object's new location in the memory area. Furthermore, the system tracks the progression of the relocation phase by coloring pointers that refer to the relocated runtime objects. Once the system has completed relocating the non-disposable runtime objects residing in a candidate region, the system reclaims the memory associated with that candidate region. The disposable runtime objects that are not relocated from a candidate region are effectively collected by the system when the memory allocated to that candidate region is reclaimed.

In an embodiment, relocation phase 708 is a concurrent phase of garbage collection cycle 700. Thus, during relocation phase 708, program operations may be attempting to manipulate runtime objects residing in a candidate region at the same time that the system is attempting to perform relocation operations in the candidate region.

5. COLORED POINTER ARCHITECTURE

Figure 8:
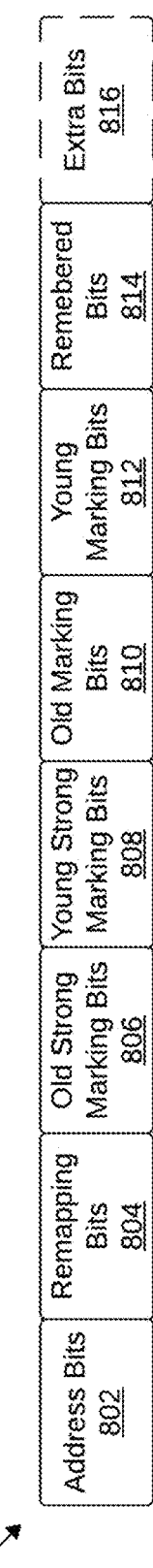
FIG. 8 illustrates an example colored pointer architecture in block diagram form according to an embodiment.

FIG. 8 illustrates an example pointer 800 in block diagram form in accordance with one or more embodiments. Pointer 800 refers to a runtime object (referred to as "the target object") residing in a memory area that is being subjected to a garbage collection process. More specifically, pointer 800 holds an address of a location in memory that is associated with the target object. The memory area, in an embodiment, includes a young generation and an old generation, and to provide clear examples, the remainder of the discussion in this Section 5 assumes the same. Accordingly, pointer 800, as illustrated in FIG. 8, is configured to track state information with respect to a garbage collection cycle that is occurring in the young generation, and pointer 800 is configured to track state information with respect to a garbage collection cycle that is occurring in the old generation. As illustrated in FIG. 8, pointer 800 includes address bits 802, remapping bits 804, old strong marking bits 806, young strong marking bits 808, old marking bits 810, young marking bits 812, remembered bits 814, and/or extra bits 816. In one or more embodiments, pointer 800 may include more or fewer components than the components illustrated in FIG. 8, and/or one or more components of pointer 800 as illustrated in FIG. 8 may be modified, rearranged, or omitted all together. It should be understood that in other embodiments, pointer 800 is configured to track state information with respect to more or fewer garbage collection cycles, and/or pointer 800 is implemented in the context of a memory area having generational boundaries that are demarcated based on criteria that is additional or alternative to any temporal characteristics of runtime objects residing in the memory area.

In an embodiment, pointer 800 is a cluster of bits in low-level memory. A reference (referred to as "the corresponding reference") to the target object is implemented in low-level memory, at least in part, by pointer 800. The corresponding reference originates from inside the memory area, or the corresponding reference originates from outside of the memory area (e.g., a local variable). If the corresponding reference originates from inside of the memory area, the corresponding reference originates from the same generation as the target object, or the corresponding reference originates from a different generation than the target object. The corresponding reference may be a strong reference, a non-strong reference, a root, and/or another reference type.

In an embodiment, the target object is associated with an address that is stored to address bits 802. Note that the address stored to address bits 802 may change during a garbage collection cycle. In an example, the target object is relocated during a garbage collection cycle, and the value stored to address bits 802 is updated to reflect the target object's new location within the memory area. In another example, a program thread, while performing a program operation, updates the address stored to address bits 802, so the corresponding reference subsequently refers to a different target object.

In an embodiment, the coloring of pointer 800 describes the state of pointer 800, and/or the coloring of pointer 800 describes the state of the target object. With respect to FIG. 8, the "coloring of pointer 800" refers to the values carried by remapping bits 804, old strong marking bits 806, young strong marking bits 808, old marking bits 810, young marking bits 812, remembered bits 814, and/or extra bits 816. Any given set of bits within pointer 800 (apart from address bits 802) may hold a good color, a bad color, or no color. The coloring of pointer 800 tracks state information with respect to a garbage collection cycle occurring in the young generation of the memory area, and/or the coloring of pointer 800 tracks state information with respect to a garbage collection cycle occurring in the old generation of the memory area. Note that the coloring of pointer 800 enables a garbage collector (e.g., garbage collector thread or a program thread executing a barrier) to make inferences about the progression of a garbage collection cycle with respect to the pointer 800 and/or the target object without having to look elsewhere to obtain state information. The ability to make inferences about the progression of a garbage collection cycle with respect to the pointer and/or target object without having to access state information stored to a separate location may reduce the cost of certain collection operations. For example, the ability to make inferences about the progression of a garbage collection cycle with respect to the target object without having to obtain state information from elsewhere reduces the cost of performing collection operations that are stipulated by barriers (e.g., load barriers, store barriers, etc.).

In an embodiment, remapping bits 804 indicate if address bits 802 stores a correct address of the target object. If remapping bits 804 hold a good color, a garbage collector can infer that pointer 800 does not need remapping. However, note that remapping bits 804 holding a bad color is not a sufficient basis for inferring that address bits 802 stores an incorrect address. If remapping bits 804 holds a bad color, address bits 802 stores the correct address, or address bits 802 stores an incorrect address. Notwithstanding, the system may draw other conclusions from remapping bits 804 storing a bad color. For instance, remapping bits 804 storing a bad color may serve as a sole basis for concluding that pointer 800 has not been subjected to any collection operations since good colors were last updated. If a thread (e.g., a garbage collector thread or a program thread executing a barrier) encounters a pointer 800 having a bad color stored to the remapping bits 804, the thread will check if the pointer 800 needs to be remapped (i.e., if the address bits 802 holds an incorrect address), and the thread will remap the pointer 800 as needed. Once it is confirmed that the address bits 802 hold the correct address, that thread will typically perform other operations for healing the pointer (e.g., stripping the bad colors from the pointer 800, storing a good color to pointer remapping bits 804, further coloring pointer 800 to reflect the state of the pointer 800 and/or the target object, etc.). The further operations performed by the thread may depend on (a) if that thread is a program thread or a garbage collector thread and/or (b) the current stage of an ongoing garbage collection cycle. Furthermore, if the thread is a program thread, further operations may depend on the particular barrier that is being executed by the program thread (e.g., a store barrier vs. a load barrier). It should also be noted that coloring of remapping bits 804, in combination with the other indicia, may serve as a foundation for other inferences.

In an embodiment, old strong marking bits 806 indicate if the target object should be treated as strongly reachable. If old strong marking bits 806 hold a good color, a garbage collector (e.g., a program thread executing a barrier) that encounters pointer 800 may treat the target object as strongly reachable. In general, a good color may be stored to old strong marking bits 806 if a garbage collector performing collection operations in the old generation marks through the target object and determines that the target object should be treated as strongly reachable. Note the coloring of old strong marking bits 806 is not necessarily an authenticate reflection of the target object's actual reachability status. A strongly reachable object may become less than strongly reachable during a garbage collection cycle. Furthermore, in some cases, a good color may be stored to old strong marking bits 806 even if the target object is not strongly reachable at any point during a garbage collection cycle. There may be scenarios where the system desires a garbage collector to treat the target object as strongly reachable in the old generation even if the target object is not actually strongly reachable. For example, if the target object resides in a different generation than another runtime object that refers to the target object, a good color may be stored to old strong marking bits 806 regardless of whatever the target object's actual reachability status may be.

In an embodiment, young strong marking bits 808 indicate if the target object should be treated as strongly reachable. If young strong marking bits 808 hold a good color, a garbage collector that interacts with pointer 800 may treat the target object as strongly reachable. In general, a good color may be stored to old strong marking bits 806 if a garbage collector performing collection operations in the young generation marks through the target object and determines that the target object should be treated as strongly reachable. Note that the coloring of young strong marking bits 808 is not necessarily an authenticate reflection of the target object's actual reachability status or the target object's location with the memory area. A strongly reachable object may become less than strongly reachable over the course of a garbage collection cycle, and a runtime object may be promoted from the young generation to the old generation. Furthermore, in some cases, a good color may be stored to young strong marking bits 808 even if the target object is not strongly reachable at any point during a garbage collection cycle. There may be scenarios where the system desires a garbage collector to treat the target object as strongly reachable from the young generation even if the target object is not actually strongly reachable. For example, if the target object resides in a different generation than another runtime object that refers to the target object, a good color may be stored to young strong marking bits 808 regardless of whatever the target object's actual reachability status may be.

Note that the presence of both old strong marking bits 806 and young strong marking bits 808 within pointer 800 enables the system to perform a concurrent marking phase in the old generation while the system is also performing a concurrent marking phase in the young generation at the same time. Lacking the presence of both old strong marking bits 806 and young strong markings bits 808, the system would be forced to coordinate the timing of the concurrent marking phase in the young generation and the timing of the concurrent marking phase in the old generation, so the two marking phases would not be performed in overlapping time frames.

In an embodiment, old marking bits 810 indicate if the target object should be treated as reachable. If old marking bits 810 hold a good color, a garbage collector that interacts with pointer 800 may treat the target object as reachable. In general, a good color may be stored to old marking bits 810 if a garbage collector performing collection operations in the old generation marks through the target object and determines that the target object should be treated as reachable. For example, if a garbage collector, while marking through the old generation, finds that the target object is strongly reachable, softly reachable, weakly reachable, finalizably reachable, or phantom reachable that garbage collector may store a good color to old marking bits 810. Note that old marking bits 810 holding a good color does not necessarily imply the target object is finalizably reachable. It should also be noted that the reachability status of the target object may change during the course of a garbage collection cycle, and there may be scenarios where the system desires the target object to be treated as reachable in the old generation even if the target object is not necessarily reachable. Thus, old marking bits 810 being colored good is not necessarily an authenticate reflection of the target object's current state. Furthermore, a thread can make other inferences about the target object based on the color of old marking bits 810 in combination with other colored bits of pointer 800. As an example, assume that (a) old marking bits 810 hold a good color and (b) old strong marking bits 806 hold no color or a bad color, and further assume that a program thread is made to perform a barrier prior to performing some program operation involving pointer 800 and/or the target object. In this example, the program thread, while executing the barrier, can infer that the target object is not strongly reachable, and the program thread can therefore conclude that program operation may resurrect the target object. Accordingly, the program thread, acting pursuant to the barrier, performs whatever collection operations may be needed to prevent concurrency issues that might otherwise arise because of the program operation being completed during a concurrent phase of a garbage collection cycle (e.g., a marking phase, a reference processing phase, etc.).

In an embodiment, young marking bits 812 indicate if the target object should be treated as reachable. If young marking bits 812 hold a good color, a garbage collector that interacts with pointer 800 may treat the target object as reachable from the young generation. In general, a good color may be stored to young marking bits 812 if a garbage collector performing collection operations in the young generation marks through the target object and determines that the target object should be treated as reachable. For example, if a garbage collector, while marking through the young generation, finds that the target object is strongly reachable, softly reachable, weakly reachable, finalizably reachable, or phantom reachable that garbage collector may store a good color to young marking bits 812. Note that young marking bits 812 holding a good color does not necessarily imply the target object is finalizably reachable. It should also be noted that, during a garbage collection cycle, the target object's reachability status may change, and/or the target object may be promoted from the young generation to the old generation. Furthermore, there may be scenarios where the system desires a garbage collector to treat the target object as reachable from the young generation even if the target object is not necessarily reachable. Thus, young marking bits 812 being colored good is not necessarily an authenticate reflection of the target object's current state. In addition to discerning if the target object should be treated as reachable from young generation, a thread can make other inferences about the target object based on the color of young marking bits 812 in combination with other colored bits of pointer 800 (e.g., young strong marking bits 808).

Note that the presence of both old marking bits 810 and young marking bits 812 within pointer 800 enables the system to perform a concurrent reference processing phase in the old generation while the system is also performing a concurrent reference processing phase in the young generation at the same time. Lacking the presence of both old marking bits 810 and young marking bits 812, the system would be forced to coordinate the timing of a concurrent reference processing phase in the young generation and the timing of a concurrent reference processing phase in the old generation, so the two concurrent reference processing phases would not be performed in overlapping time frames.

In an embodiment, remembered bits 814 indicate if an object field holding the pointer's 800 corresponding reference has been included within a remembered set since good colors were last updated. If the corresponding reference is held by an object field of a runtime object, a good color may be stored to remembered bits 814 by a program thread that is acting pursuant to a store barrier imposed on the program thread. Note that a store barrier may be imposed on a program thread if that program thread is attempting to remap pointer 800. In particular, a program thread, acting pursuant to a store barrier, will add the object field holding the corresponding reference to a remembered set and will store a good color to remembered bits 814 if (a) the runtime object including the object field resides within the old generation and (b) the remembered bits 814 do not already store a good color. If that program thread or another program thread, while performing another program operation, subsequently remaps pointer 800 a second time, that program thread can infer, based on the remembered bits holding the good color, that the object field holding the corresponding reference has already been entered into the remembered set. Therefore, the program thread may refrain from generating another entry in the remembered set for that object field.

In an embodiment, extra bits 816 may be colored to indicate additional state information of pointer 800, and/or extra bits 816 may be colored to indicate additional state information of the target object. The presence or absence of pointer extra bits 816 within pointer 800 may depend on the size of pointer 800 and the size of other sets of bits within pointer 800.

6. MANAGING REFERENCE OBJECTS RESIDING IN MULTIPLE GENERATIONS

Figure 9:
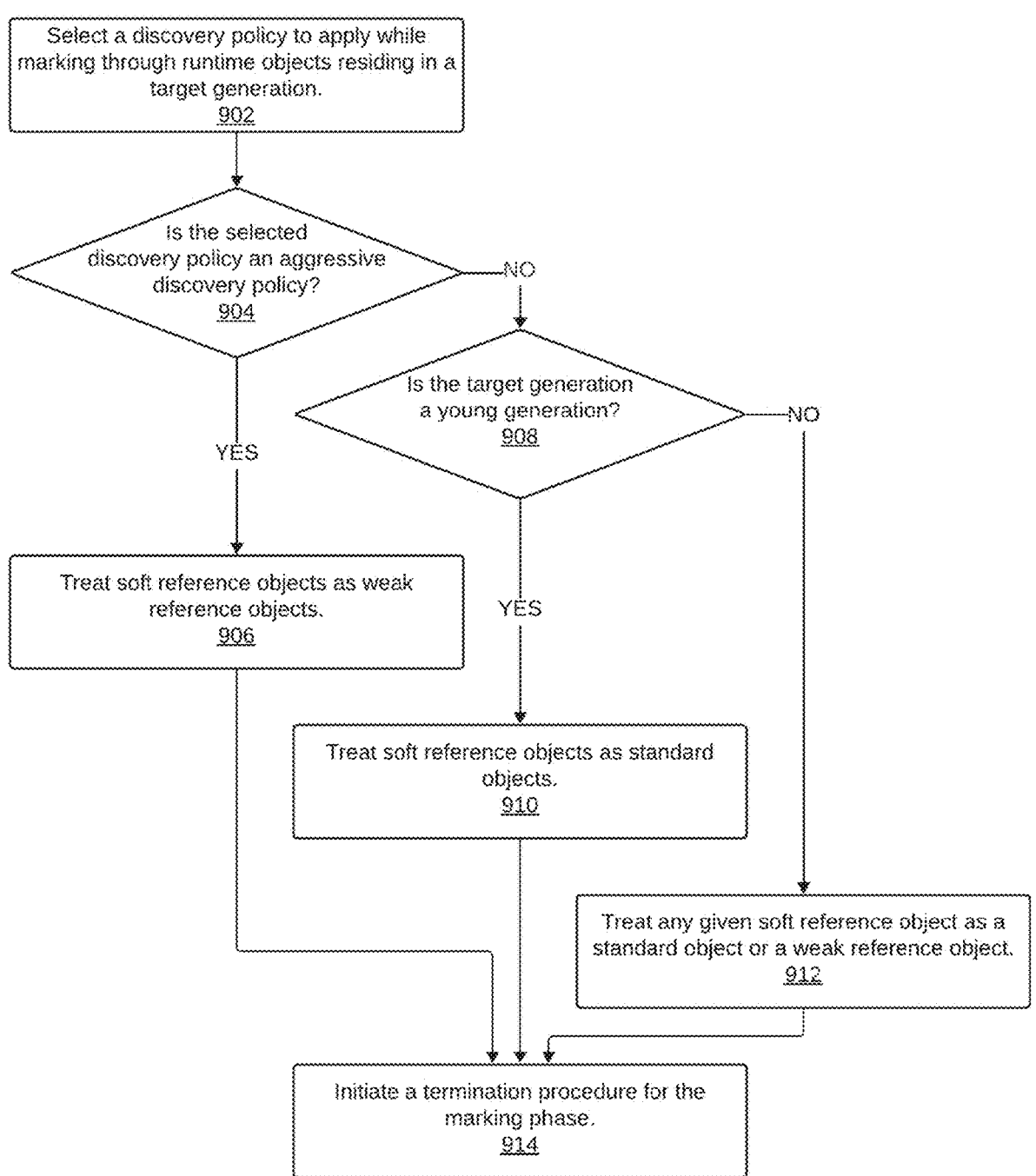
FIG. 9 illustrates an example set of operations for marking reference objects according to an embodiment.
Figure 10:
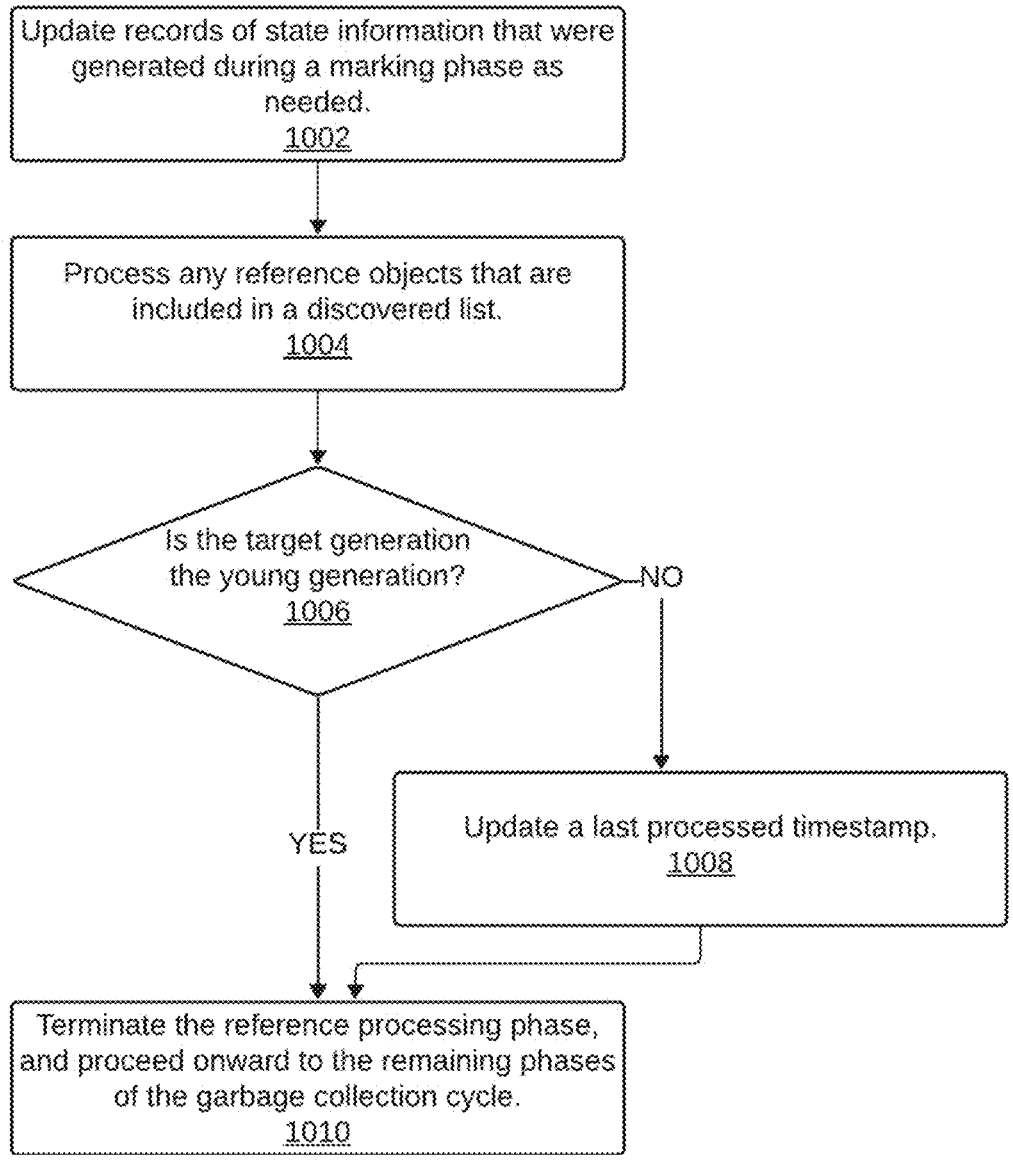
FIG. 10 illustrates an example set of operations for processing reference objects according to an embodiment.

FIG. 9 and FIG. 10 illustrate example collection operations that may be performed in furtherance of a garbage collection cycle that is occurring in a particular generation (referred to as "the target generation") of a memory area in accordance with one or more embodiments. For the purposes of clarity and understanding, collection operations are generally described below with respect to the specific garbage collection cycle that is occurring in the target generation (referred to as "the garbage collection cycle"). However, it should be understood that the garbage collection cycle may be one of multiple garbage collection cycles that the system performs during the garbage collection process. Furthermore, note that the system may be performing the garbage collection cycle in the target generation while the system is also performing other garbage collection cycle(s) in other generation(s) of the memory area at the same time. The memory area, according to an embodiment, includes a young generation and an old generation, and to provide clear examples, the remainder of the discussion in this Section 6 assumes the same. In other embodiments, however, the techniques described below are applied to other configurations of a memory area. For instance, the techniques described below may be applied to a memory area that includes more or fewer generations, and/or the techniques described below may be applied to a memory area having generational boundaries that are demarcated based on criteria that are additional or alternative to any temporal characteristics of runtime objects residing in the memory area.

6.1 Marking Soft Reference Objects

FIG. 9 illustrates example marking operations that may be performed in accordance with one or more embodiments. The marking operations are performed in furtherance of a concurrent marking phase occurring in the target generation of the memory area. The target generation is the young generation, or the target generation is the old generation. Note that the system may be performing concurrent marking operations in the young generation, while the system is also performing concurrent marking operations in the old generation. One or more operations illustrated in FIG. 9 may be modified, rearranged, or omitted all together. Accordingly, the particular sequence of operations illustrated in FIG. 9 should not be construed as limiting on the scope of one or more embodiments.

In an embodiment, the system selects a discovery policy to apply while generating record(s) of state information (Operation 902). In particular, the system selects a discovery policy to apply while generating a discovered list and/or other records of state information (e.g., a live map, colored pointers, reached-by-data structures, etc.) while marking through runtime objects residing in the target generation. The system selects an aggressive discovery policy, a conservative discovery policy, or another type of discovery policy. Recall that an aggressive discovery policy is generally configured to cause the collection of more runtime objects residing in a memory area, whereas a conservative discovery policy is generally configured to cause the collection of fewer runtime objects residing in a memory area. Example inputs that potentially influence the system's selection of a discovery policy include memory pressure within the memory area, memory capacity of the memory area, memory pressure within the target generation, memory capacity of the target generation, memory intensity of a program instance storing information to the memory area, and others. In an example, memory pressure in the memory area is high, and the system selects an aggressive discovery policy. In another example, memory pressure in the memory area is low, and the system selects a conservative discovery policy. Note that in the foregoing examples, the delineation between high memory pressure and low memory pressure may be defined by the system, and/or the delineation between high memory pressure and low memory pressure may be defined by a user of the system.

In an embodiment, the system determines how to treat soft reference objects while marking through runtime objects in accordance with a selected discovery policy, and the system proceeds to another operation based on the determination (Operation 904). If the system has selected an aggressive discovery policy (YES at Operation 904), the system proceeds to Operation 906. Alternatively, if the system has not selected an aggressive discovery policy (e.g., the system has selected a conservative discovery policy) (NO in Operation 904), the system proceeds to Operation 908.

In an embodiment, the system, acting in accordance with the aggressive discovery policy, treats soft reference objects as weak reference objects while marking through runtime objects residing in the target generation of the memory area (Operation 906). In particular, the system treats soft reference objects as weak reference objects while generating a discovered list. In this scenario, the system treats a soft reference object residing in the target generation as a weak reference object regardless of whether or not the target generation is the young generation or the old generation. In an example application of the aggressive discovery policy, the system encounters a soft reference object while marking through a strong object graph of the target generation. In this example, the system evaluates if the soft reference object's referent is strongly reachable. To this end, the system may consider other records of state information that are also being generated during the marking phase (e.g., a live map, colored pointers, etc.). If the system presumes that the soft reference object's referent is strongly reachable in this example, the system refrains from adding the soft reference object to a discovered list. Alternatively, if the system presumes that the soft reference object's referent is not strongly reachable in this example, the system adds the soft reference object to the discovered list. It should be noted that in some cases, a reference object may be added to a discovered list based on an incomplete understanding of reachability within the target generation. For instance, considering the above example further, assume that the system adds the soft reference object to the discovered list based on a live map indicating that the reference object's referent is not strongly reachable. As the system continues to mark through the strong object graph of the target generation in this example, the system may come to find a chain of strong references that renders that referent strongly reachable, and the system may update the live map accordingly. In this example, the addition of the soft reference object to the discovered list is erroneous. As is explained in further detail below, the system may correct the error in the discovered list of this example following the completion of the marking phase.

In an embodiment, the system determines if the target generation is the young generation of the memory area, and the system proceeds to another operation based on the determination (Operation 908). Note that in this scenario, the system has selected a conservative discovery policy, and the conservative discovery policy may dictate that a young soft reference object is treated differently than an old soft reference object. If the target generation is the young generation (YES in Operation 908), the system proceeds to Operation 910. Alternatively, if the target generation is the old generation (NO in Operation 908), the system proceeds to Operation 912.

In an embodiment, the system, acting in accordance with the conservative discovery policy, treats soft reference objects as standard objects while marking through runtime objects residing in the target generation of the memory area (Operation 910). Note that in this scenario, the target generation is the young generation of the memory area. In particular, the system treats soft reference objects as standard objects while generating a discovered list. As an example, assume that the system encounters a soft reference object while marking through a strong object graph of the target generation. In this example, the system marks through the soft reference object as if the soft reference object were a standard object. Recall that standard objects are not added to a discovered list. Therefore, in this example, the system does not add the soft reference object to a discovered list regardless of whatever the reachability status of the soft reference object's referent may be. In addition, if the soft reference object's referent is softly reachable, the system may mark the referent as live in a live map, and the system may mark any other runtime objects that are softly reachable through the soft reference object as live in the live map.

In an embodiment, the system, acting in accordance with the conservative discovery policy, treats any given soft reference object as either a standard object or a weak reference object while marking through runtime objects in the target generation of the memory area (Operation 912). Note that, in this scenario, the target generation is the old generation of the memory area. In particular, the system treats a soft reference object as either a standard object or a weak reference object while generating a discovered list. The conservative discovery policy dictates that an old, soft reference object is treated as either a standard reference object or a weak reference object based on how recently that old soft reference object has been used to access the soft reference object's referent. If an old soft reference object has been used recently, the conservative discovery policy dictates that the old soft reference object is treated as a standard object. On the other hand, if an old soft reference object has not been used recently, the conservative discovery policy dictates that the old soft reference object is treated as a weak reference object. Recall that standard objects are not added to a discovered list, whereas weak reference objects are added to a discovered list if the weak reference object's referent is not strongly reachable. To discern between recent use and non-recent use, the system may compare (a) when an old soft reference object was last used to access the old soft reference object's referent to (b) when a reference processing phase last occurred in the old generation. As an example, assume that the system encounters a soft reference object while marking through a strong object graph of the old generation. Upon encountering the soft reference object in this example, the system accesses a last used timestamp that is carried by a private field of the soft reference object, and the system accesses a last processed timestamp that is carried by a global variable. The system decides how to treat the soft reference object in this example based on the last used timestamp and the last processed timestamp. For instance, if the timestamps together indicate that the soft reference object has been used to access the soft reference object's referent at some point after the last reference processing phase occurred in the old generation, the system may treat the soft reference object as a standard object in this example. Therefore, the system would not add the soft reference object to the discovered list in this example. Additionally, the system may mark any runtime objects that are softly reachable through the soft reference object of this example as being live in a live map. Alternatively, if the timestamps together indicate that the soft reference object has not been used to access the soft reference object's referent since before the last reference processing phase occurred in the old generation, the system may treat the soft reference object as a weak reference object in this example. Therefore, the system would add the soft reference object to the discovered list as long as the soft reference object's referent is not strongly reachable in this example. Note that in other examples, the formula the system uses for deciding how to treat an old soft reference object based on a last used timestamp and a last processed timestamp may vary. For instance, in another example, the system calculates a differential based on the timestamps, and the system compares the differential to a threshold value. In this example, the threshold value is defined by the system, and/or the threshold value is defined by a user. The threshold value of this example may be dynamically altered by the system during or between applications to reflect changing circumstances. For instance, the system may alter the threshold value of this example based on memory pressure in the memory area changing.

In an embodiment, the system determines that no more runtime objects residing in the target generation require marking, and the system initiates a termination procedure for the marking phase based on the determination (Operation 914). During the termination procedure, the system schedules a safe point for pausing the program threads and terminating the marking phase. Note that while the program threads are being corralled to the safe point during the termination procedure, program operations may continue in the memory area until the program threads reach the safe point. Consequently, during the termination procedure, a program operation may mutate the target generation in a manner that renders a record of state information inaccurate. For example, while the termination procedure is ongoing, a program thread may resurrect a referent by calling a get() method of a soft reference object or a weak reference object. Note that in this example, the resurrection may render a live map, a discovered list, and/or other records of state information inaccurate. If a referent of a reference object is resurrected during the termination procedure, the system records the resurrection in a resurrected set and continues with the termination procedure. As is explained in further detail below, the system will correct any inaccuracies in records of state information that result from resurrections following the completion of the termination procedure.

6.2 Processing Soft Reference Objects

FIG. 10 illustrates example reference processing operations that may be performed in accordance with one or more embodiments. The reference processing operations are performed in furtherance of a concurrent reference processing phase occurring in the target generation of the memory area. The target generation is the young generation, or the target generation is the old generation. Note that the system may be performing concurrent reference processing operations in the young generation, while the system is also performing concurrent reference processing operations in the old generation. One or more operations illustrated in FIG. 10 may be modified, rearranged, or omitted all together. Accordingly, the particular sequence of operations illustrated in FIG. 10 should not be construed as limiting on the scope of one or more embodiments.

In an embodiment, the system updates, as needed, records of state information that were generated during a marking phase (Operation 1002). In particular, the system may update a live map, a discovered list, colored pointers, and/or other records of state information. The system updates a record of state information to reflect (a) any resurrections that may have occurred during a termination procedure for the marking phase, (b) any erroneous markings that were made based on an incomplete understanding of reachability within the memory area, and/or (c) other occurrences.

The system, according to an embodiment, updates record(s) of state information to reflect any resurrection(s) that occurred during a termination procedure for the concurrent marking phase. For instance, the system may update a discovered list, a live map, colored pointers, and/or other records of state information. As an example, assume that a get( ) method of a reference object was called during the termination procedure, and further assume that the reference object's referent was resurrected as a result. In this example, the system identifies the reference object and the resurrected referent based on a resurrected set that was generated during the termination procedure. If, in this example, the reference object is included in the discovered list, the system removes the reference object from the discovered list because the resurrected referent is now strongly reachable. The system of this example accesses a reached-by-data structure that was generated for the resurrected referent during the marking phase. Based on the reached-by-data structure, the system updates a live map to reflect the resurrected referent becoming strongly reachable in this example. Further, if the resurrected referent becoming strongly reachable has resulted in other changes to reachability in the memory area (e.g., other runtime objects becoming strongly reachable), the system of this example may further update the live map accordingly. Additionally, if the resurrected referent is, in turn, a reference object having a referent that is not strongly reachable, the system adds the resurrected referent to the discovered list. Furthermore, if the system discovers other reference objects in the reached-by-data structure whose referents are not strongly reachable, the system adds those reference objects to the discovered list as well. Note that while the system is updating the discovered list and the live map in this example, the system may also be coloring pointers to match.

The system, according to an embodiment, updates a discovered list to remove any reference objects that were added to the discovered list based on an incomplete understanding of reachability within the memory area. Note that a reference object may be erroneously included in a discovered list even if no resurrections occur during a marking phase. Having since completed the marking phase, the system may expect that a live map, colored pointers, and/or other records of state information will present a more complete understanding of reachability within the memory area. Thus, the system iterates through the discovered list while cross referencing other records of state information. In particular, the system may consult a live map and/or other records of state information to check the reachability status of a referent of a reference object that is included within the discovered list. If the system finds that a referent of a reference object is marked as strongly reachable, the system drops that reference object from the discovered list. Furthermore, if the system finds that a referent of a phantom reference object is marked as live, that phantom reference object may be dropped from the discovered list.

In an embodiment, the system processes any reference object(s) that are included within the discovered list after any appropriate updates to the discovered list have been applied (Operation 1004). The discovered list may contain soft reference objects, weak reference objects, final reference objects, phantom reference object, and/or other reference objects. The system processes a reference object included in the discovered list by clearing the reference object, enqueueing the reference object, and/or performing other reference processing operations. Recall that clearing a reference object tends to result in the reference object's referent being collected, and clearing a reference object tends to result in the collection of any other runtime objects that are only reachable through the reference object's referent. Further recall that a reference object is cleared based on inclusion within the discovered list, and the content of the discovered list may be impacted by a discovery policy that the system selects for application. Note that in view of the foregoing, the system may increase or decrease the amount of memory that is reclaimed by a garbage collection process by selecting an aggressive discovery policy or a conservative discovery policy. As an example, assume that the system applies an aggressive discovery policy while formulating the discovered list. In this example, any soft reference object that the system encounters while marking through a strong object graph of the target generation is cleared if the soft reference object's referent is not strongly reachable. Note that in this example, the treatment of a soft reference object is the same regardless of whether the target generation is the old generation or the young generation. As another example, assume that the system applies a conservative discovery policy while formulating the discovered list, and further assume that the target generation is the young generation. In this example, the system will not clear any of the soft reference objects residing in the target generation. In another example, assume that the system applies a conservative discovery policy while formulating the discovered list, and further assume that the target generation is the old generation. In this example, any given soft reference object that the system encounters while marking through the target generation may or may not be cleared by the system. The system of this example clears the old soft reference objects that have not been used recently, and the system of this example refrains from clearing the old soft reference objects that have been used recently.

In an embodiment, the system determines if the target generation is the young generation of the memory area, and the system proceeds to another operation based on the determination (Operation 1006). If the target generation is the young generation (YES in Operation 1006), the system proceeds to Operation 1010. Alternatively, if the target generation is the old generation (NO in Operation 1006), the system proceeds to Operation 1008. Note that the system is, in effect, deciding if the last processed timestamp needs to be updated.

In an embodiment, the system updates a last processed timestamp (Operation 1008). In this scenario, the target generation is the old generation, and the system updates the last processed timestamp to track the timing of the reference processing operations that the system has performed in the old generation. The system does not update the last processed timestamp to track the timing of any reference processing operations that occur in the young generation. Recall that (a) the system performs garbage collection cycles in the young generation while the system is also performing garbage collection cycles in the old generation, (b) the frequency of garbage collection cycles in the young generation may differ greatly from the frequency of garbage collection cycles in the old generation, (c) the system is able to perform a concurrent reference processing phases in the young generation while the system is simultaneously performing a concurrent reference processing phase in the old generation, and (d) the system therefore has no need to coordinate the timing of a concurrent reference processing phase occurring in the young generation with the timing of a concurrent reference processing phase occurring in the old generation. Note that in view of the foregoing, there may be no easily predictable relationship between (a) the timing of a reference processing phase that most recently occurred in the young generation and (b) the timing of another reference processing phase that most recently occurred in the old generation. Thus, if the system were to update the last processed timestamp any time a reference processing phase occurs in either the young generation or the old generation, the meaning of the last processed timestamp may become uncertain, and the significance of a comparison between the last processed timestamp and a last used timestamp of a soft reference may become arbitrary. Consequently, the system might be rendered unable to reliably distinguish between (a) soft reference objects residing in a particular generation that have been used recently and (b) soft reference objects residing in that particular generation that have not been used recently. However, by refraining from updating the last processed timestamp in the event of reference processing in the young generation, the system preserves the significance of the last used timestamp with respect to the old generation. Recall that the system allows soft reference objects to be promoted to the old generation before the system attempts to distinguish between recently used soft reference objects and soft reference objects that have not recently been used.

In an embodiment, the system terminates the reference processing phase, and the system proceeds onward to the remaining phases of the garbage collection cycle (Operation 1010). For example, having completed the reference processing phase, the system may continue onwards to an evacuation candidate selection phase and a relocation phase.

7. EXAMPLE EMBODIMENT

Figure 11:
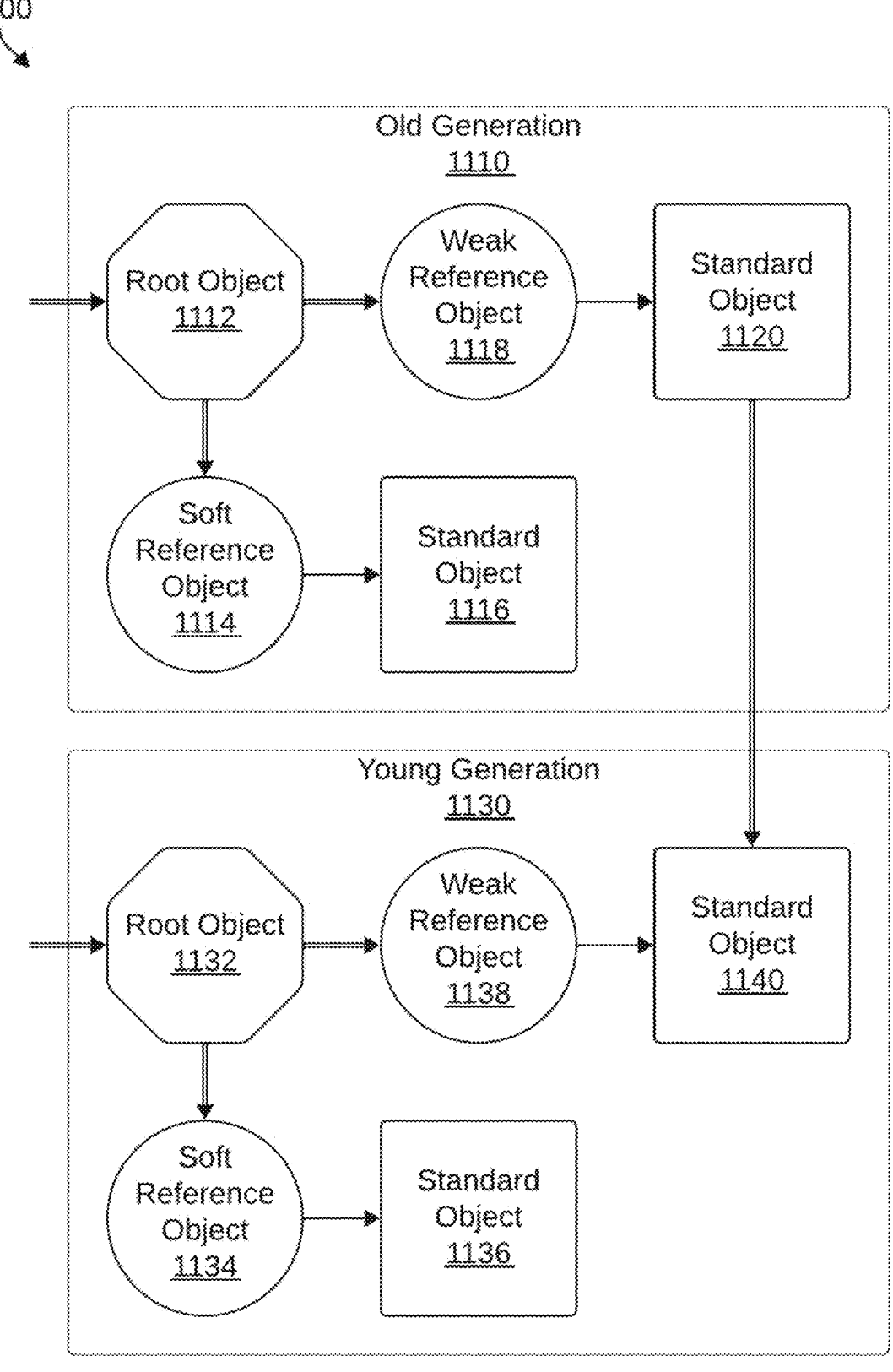
FIG. 11 illustrates an example multi-generation memory area that is subjected to a garbage collection process according to an example embodiment.

FIG. 11 illustrates a memory area 1100 in accordance with an example embodiment. Detailed examples are described below for purposes of clarity. Components and/or operations described below should be understood as specific examples that may not be applicable to certain embodiments. Accordingly, components and/or operations described below should not be construed as limiting the scope of any of the claims. As illustrated in FIG. 11, memory area 1100 includes an old generation 1110 and a young generation 1130. For the purposes of the example depicted by FIG. 11, the remainder of the discussion in this Section 7 assumes (a) that a concurrent garbage collection cycle is occurring in the old generation 1110 and (b) that another concurrent garbage collection cycle is occurring in the young generation 1130.

In an example embodiment, old generation 1110 includes root object 1112, soft reference object 1114, standard object 1116, weak reference object 1118, and standard object 1120. As illustrated in FIG. 11, the runtime objects residing in old generation 1110 are reachable. Root object 1112, soft reference object 1114, and weak reference object 1118 are strongly reachable. Standard object 1116 is softly reachable, and standard object 1120 is weakly reachable. Standard object 1120 possess an uncalled finalizer method, and the uncalled finalizer method strongly refers to standard object 1140.

In an example embodiment, young generation 1130 includes root object 1132, soft reference object 1134, standard object 1136, weak reference object 1138, and standard object 1140. As illustrated in FIG. 11, the runtime objects residing in old generation 1110 are reachable. Root object 1132, soft reference object 1134, and weak reference object 1138 are strongly reachable. Standard object 1136 is softly reachable, and standard object 1140 is weakly reachable.

In an example embodiment, a concurrent marking phase is occurring in old generation 1110 (referred to as the "old marking phase"). Note that while the old marking phase is occurring, another concurrent marking phase may be occurring in the young generation 1130 (referred to as the "young marking phase").

In an example embodiment, a garbage collector traverses a root pointing into old generation 1110 to mark through root object 1112 during the old marking phase. The garbage collector identifies the root based on a snapshot of the memory area 1100. While marking through root object 1112, the garbage collector updates a live map to indicate that root object 1112 is live and strongly reachable.

In an example embodiment, root object 1112 strongly refers to soft reference object 1114, and a garbage collector traverses that strong reference to mark through strong reference object 1114 during the old marking phase. While marking through soft reference object 1114, the garbage collector colors a pointer to indicate soft reference object 1114 is reachable and strongly reachable from the old generation, and the garbage collector updates a live map to mark the soft reference object 1114 as live and strongly reachable. The garbage collector also consults the live map to learn if standard object 1116 has been marked as strongly reachable during the old marking phase. The garbage collector finds that standard object 1116 is not marked as strongly reachable. Therefore, soft reference object 1114 may be eligible for inclusion in a discovered list depending on the discovery policy that is in effect. If an aggressive discovery policy is in effect, the garbage collector adds soft reference object 1114 to a discovered list. If a conservative discovery policy is in effect, the garbage collector compares a last used timestamp of soft reference object 1114 to a last processed timestamp. Based on the comparison, the garbage collector determines if soft reference object 1114 has recently been used by a program instance to access standard object 1116. If soft reference object 1114 has recently been used to access standard object 1116, the garbage collector does not add soft reference object 1114 to the discovered list. Note that in this scenario, the system may also mark standard object 1116 as live in a live map to prevent standard object 1116 from being collected. If soft reference object 1114 has not recently been used to access standard object 1116, the garbage collector includes soft reference object 1114 in the discovered list, and the garbage collector may refrain from marking standard object 1116 as live in the live map. Upon finding that soft reference object 1114 does not strongly refer to any other runtime object, the garbage collector backtracks to look for other strong references that originate from root object 1112.

In an example embodiment, root object 1112 strongly refers to weak reference object 1118, and a garbage collector traverses that strong reference to mark through weak reference object 1118 during the old marking phase. While marking through weak reference object 1118, the garbage collector colors a pointer to mark weak reference object 1118 as reachable and strongly reachable from the young generation, and the garbage collector updates a live map to mark the weak reference object 1118 as live and strongly reachable. The garbage collector consults the live map to learn if standard object 1120 has been marked as strongly reachable. Upon finding that the standard object 1120 is not marked as strongly reachable, the garbage collector adds weak reference object 1118 to a discovered list. As weak reference object 1118 does not strongly refer to any other runtime objects, the garbage collector may backtrack to look for other strongly reachable objects. However, since old generation 1110 contains no further strongly reachable objects, the garbage collector may begin to look for finalizably reachable objects residing in the old generation 1110.

In an example embodiment, a garbage collector finds no finalizably reachable runtime objects residing in old generation 1110 during the old marking phase. Therefore, the garbage collector does not mark through any finalizably reachable objects during the old marking phase. Having concluded that no finalizably reachable objects in old generation 1110 require marking, the garbage collector may begin to look for softly reachable objects and weakly reachable objects residing in old generation 1110.

In an example embodiment, soft reference object 1114 softly refers to standard object 1116, and a garbage collector traverses that soft reference to mark through standard object 1116. While marking through standard object 1116, the garbage collector colors a pointer corresponding to the soft reference to mark standard object 1116 as reachable from the old generation, and the garbage collector generates a reached-by-data structure for standard object 1116.

In an example embodiment, weak reference object 1118 weakly refers to standard object 1120, and a garbage collector traverses that weak reference to mark through standard object 1120 during the old marking phase. While marking through standard object 1120, the garbage collector colors a pointer corresponding to the weak reference to mark standard object 1120 as reachable, and the garbage collector generates a reached-by-data structure for standard object 1120. While generating the reached-by-data structure, the garbage collector may traverse the strong reference to standard object 1140, and the garbage collector may color a pointer corresponding to that strong reference to mark standard object 1140 as reachable from the old generation. If the garbage collector discerns that the strong reference potentially refers to a runtime object in young generation 1130, the garbage collector may add the object field of standard object 1120 holding that strong reference to a remembered set. Additionally, or alternatively, the garbage collector performs additional collection operations to alert the garbage collection cycle in the young generation that the strong reference should be treated as a root in the young generation 1130.

In an example embodiment, a garbage collector traverses a root pointing into young generation 1130 to mark through root object 1132 during a young marking phase. The garbage collector identifies the root based on a snapshot of the memory area 1100. While marking through root object 1132, the garbage collector updates a live map to indicate that root object 1132 is live and strongly reachable.

In an example embodiment, root object 1132 strongly refers to soft reference object 1134, and a garbage collector traverses that strong reference to mark through soft reference object 1134 during the young marking phase. While marking through soft reference object 1134, the garbage collector colors a pointer corresponding to the soft reference to indicate soft reference object 1134 is reachable and strongly reachable from the young generation 1130, and the garbage collector updates a live map to indicate that soft reference object 1134 is live and strongly reachable. The garbage collector also consults the live map to learn if standard object 1136 has been marked as strongly reachable. The garbage collector finds that standard object 1136 is not marked as strongly reachable; therefore, soft reference object 1134 may be eligible for inclusion in a discovered list depending on the discovery policy that is in effect. If an aggressive discovery policy is in effect, the garbage collector adds soft reference object 1134 to a discovered list. If a conservative discovery policy is in effect, the garbage collector does not add soft reference object 1134 to the discovered list. Note that in this scenario, the garbage collector may also mark standard object 1136 as live in a live map to prevent standard object 1136 from being collected. Upon finding that soft reference object 1134 does not strongly refer to any other runtime object, the garbage collector backtracks to look for other strong references that originate from root object 1132.

In an example embodiment, root object 1132 strongly refers to weak reference object 1138, and a garbage collector traverses that strong reference to mark through weak reference object 1138 during the young marking phase. While marking through weak reference object 1138, the garbage collector colors a pointer to mark weak reference object 1138 as reachable and strongly reachable from the young generation, and the garbage collector updates a live map to mark the weak reference object 1138 as live and strongly reachable. The garbage collector consults the live map to learn if standard object 1140 has been marked as strongly reachable. Note that while standard object 1140 is not strongly reachable, standard object 1140 may, at this point, be marked as strongly reachable in the live map to reflect the fact that standard object 1120 refers to standard object 1140. The reference from standard object 1120 to standard object 1140 crosses an intergenerational boundary of the memory area 1100. Therefore, the object field holding this strong reference will be represented within a remembered set. The presence of this entry within the remembered set will dictate that standard object 1140 is marked as strongly reachable in the live map. Whether or not standard object 1140 is marked as strongly reachable in the live map may depend on the (a) when this entry is included within the remembered set, (b) when the live map was last updated to reflect the entries in the remembered set, and/or (c) other factors. If standard object 1140 is not marked as strongly reachable in the live map, the garbage collector would add weak reference object 1138 to a discovered list. Note that the addition of weak reference object 1138 to the discovered list is erroneous. As weak reference object 1138 does not strongly refer to any other runtime objects, the garbage collector may backtrack to look for other strongly reachable objects.

In an example embodiment, standard object 1120 strongly refers to standard object 1140, and a garbage collector traverses that strong reference to mark through standard object 1140. Note that the strong reference does not actually render standard object 1140 strongly reachable. However, to allow the young marking phase to be completed in isolation of the old marking phase, the garbage collector treats the strong reference as a root into the young generation 1130. Therefore, while marking through standard object 1140, the garbage collector updates a live map to indicate that standard object 1140 is live and strongly reachable, and the garbage collector colors a pointer to mark standard object 1140 as reachable and strongly reachable from the young generation. Depending on the timing of the young marking phase relative to the old marking phase, the pointer may or may not already be colored to indicate that standard object 1140 is also reachable and/or strongly reachable from the old generation. Note that in this example, if weak reference object 1138 was previously added to a discovered list, weak reference object 1138 will be removed from the discovered list based on standard object 1140 now being marked as strongly reachable in the live map.

In an example embodiment, a garbage collector finds no finalizably reachable runtime objects residing in young generation 1130 during the young marking phase. Therefore, the garbage collector does not mark through any finalizably reachable objects during the young marking phase. Having concluded that no finalizably reachable objects in the young generation 1130 require marking, the garbage collector may begin to look for softly reachable and weakly reachable objects residing in the young generation 1130.

In an example embodiment, soft reference object 1134 softly refers to standard object 1136, and a garbage collector traverses that soft reference to mark through standard object 1136 during the young marking phase. While marking through standard object 1136, the garbage collector colors a pointer corresponding to the soft reference to mark standard object 1136 as reachable from the young generation, and the garbage collector generates a reached-by-data structure for standard object 1136.

In an example embodiment, weak reference object 1138 weakly refers to standard object 1140, and a garbage collector traverses that weak reference to mark through standard object 1140 during the old marking phase. While marking through standard object 1140, the garbage collector colors a pointer corresponding to the weak reference to mark standard object 1140 as reachable and strongly reachable from the young generation.

8. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 12:
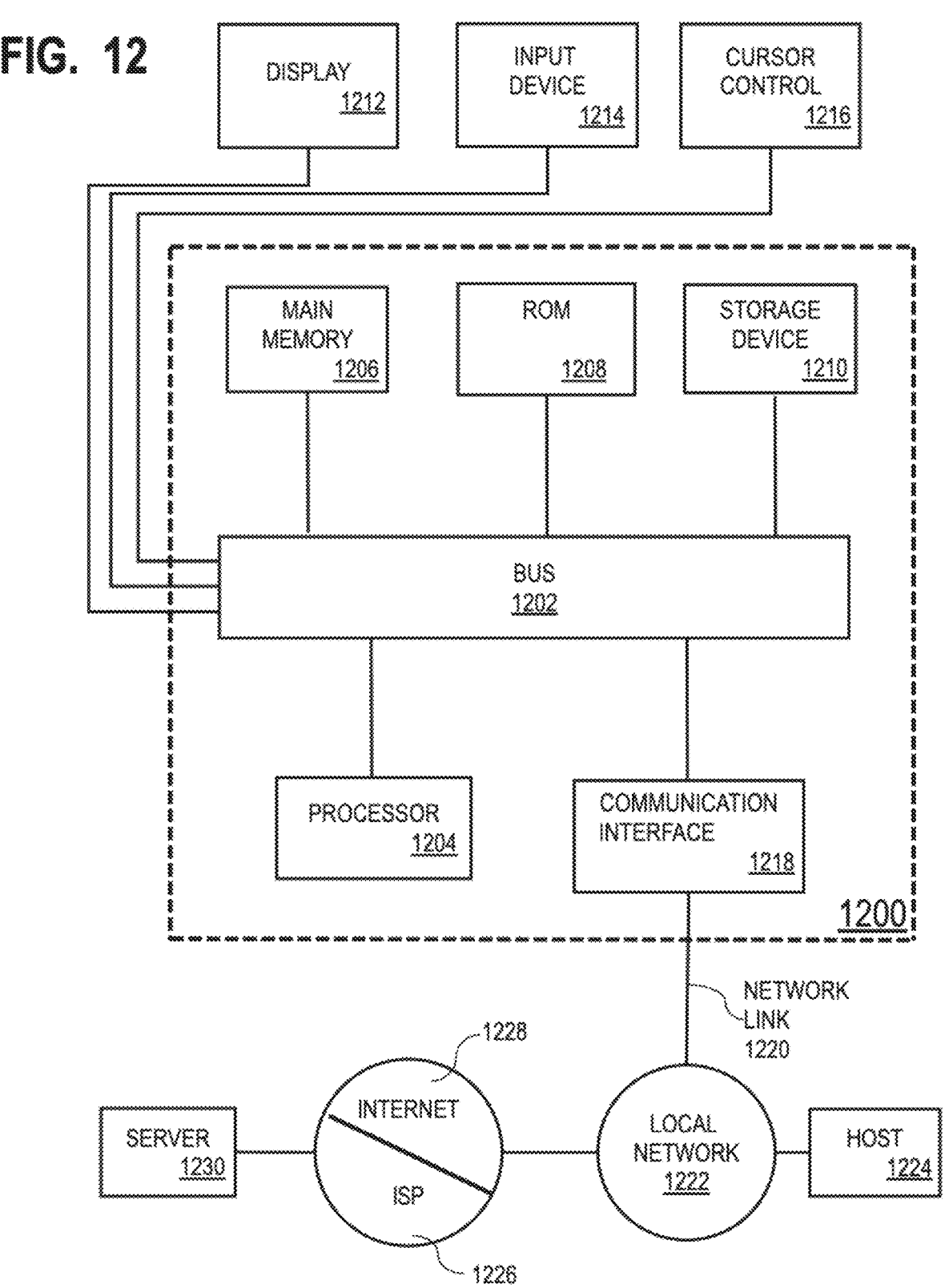
FIG. 12 illustrates a computer system in block diagram form according to an embodiment.

For example, FIG. 12 is a block diagram that illustrates a computer system 1200 upon which an embodiment of the disclosure may be implemented. Computer system 1200 includes a bus 1202 or other communication mechanism for communicating information, and a hardware processor 1204 coupled with bus 1202 for processing information. Hardware processor 1204 may be, for example, a general purpose microprocessor.

Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1210. Volatile media includes dynamic memory, such as main memory 1206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 holds the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution.

9. MISCELLANEOUS; EXTENSIONS

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer-readable storage media comprises instructions that, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. One or more non-transitory computer-readable media comprising instructions that, when executed by one or more hardware processors, cause performance of operations comprising:

performing a first set of garbage operations targeting a first section of a memory area, the first set of garbage collection operations comprising:

identifying a first reference object that holds a first reference to a first referent, the first section of the memory area comprising the first reference object and the first referent, wherein the first reference is classified as a second reference type;

based, at least in part, on determining that the first reference object is classified as a first type of reference object, refraining from adding the first reference object to a first list of one or more reference objects;

breaking a first set of one or more references of the second reference type that are respectively held by a first set of one or more reference objects comprised within the first list of one or more reference objects, wherein the first set of one or more references does not comprise the first reference to the first referent;

performing a second set of garbage collection operations targeting a second section of the memory area, the second set of garbage collection operations comprising operations comprising:

identifying a second reference object that holds a second reference to a second referent, the second section of the memory area comprising the second reference object and the second referent, wherein (a) the second reference object is classified as the first type of reference object and (b) the second reference is classified as the second reference type;

based, at least in part, on at least one of: (a) a first timestamp corresponding to a prior set of garbage collection operations targeting the second section of the memory area or (b) a second timestamp corresponding to the second reference object being used to access the second referent, adding the second reference object to a second list of one or more reference objects;

breaking a second set of one or more references of the second reference type that are respectively held by a second set of one or more reference objects comprised within the second list of one or more reference objects, wherein the second set of one or more references comprises the second reference to the second referent; and updating the first timestamp, wherein the first timestamp subsequently corresponds to the second set of garbage collection operations targeting the second section of the memory area.

2. The one or more non-transitory computer-readable media of claim 1, wherein at least a first subset of the first set of garbage collection operations are performed while a first set of runtime objects comprised within the first section of the memory area are being concurrently manipulated by at least one program thread that is executing a program instance, wherein at least a second subset of the second set of garbage collection operations are performed while a second set of runtime objects comprised within the second section of the memory area are being concurrently manipulated by the at least one program thread that is executing the program instance, wherein the first referent is not accessible through a first chain of one or more references of a first reference type, wherein the second referent is not accessible through a second chain of one or more references of the first reference type, wherein the first reference type is a strong reference type, wherein the second reference type is a non-strong reference type, and wherein the first type of reference object is a soft type of reference object.

3. The one or more non-transitory computer-readable media of claim 1, wherein the operations further comprise:

prior to breaking the first set of one or more references of the second reference type:

identifying a third reference object that holds a third reference to a third referent, the first section of the memory area comprising the third reference object and the third referent, wherein the third reference is classified as the second reference type;

based, at least in part, on determining that (a) the third reference object is a second type of reference object and (b) the third referent is not reachable through a chain of one or more references of a first reference type, adding the third reference object to the first list of one or more reference objects;

identifying a fifth reference object that holds a fifth reference to a fifth referent, the first section of the memory area comprising the fifth reference object and the fifth referent, wherein (a) the fifth reference is classified as the second reference type and (b) the fifth reference object is classified as the second type of reference object;

based, at least in part, on determining that the fifth referent is strongly reachable through a fifth chain of one or more references of the first reference type, refraining from adding the fifth reference object to the first list of one or more reference objects;

prior to breaking the second set of one or more references of the second reference type:

identifying a fourth reference object that holds a fourth reference to a fourth referent, the second section of the memory area comprising the fourth reference object and the fourth referent, wherein (a) the fourth reference object is classified as the first type of reference object and (b) the fourth reference is classified the second reference type; and based, at least in part, on at least one of: (a) the first timestamp corresponding to the prior set of garbage collection operations targeting the second section of the memory area or (b) a fourth timestamp corresponding to the fourth reference object being used to access the fourth referent, refraining from adding the fourth reference object to the second list of one or more reference objects.

4. The one or more non-transitory computer-readable media of claim 1, wherein the operations further comprise:

based, at least in part, on a first level of memory pressure in the memory area, selecting a first policy for processing reference objects, wherein (a) the first set of garbage collection operations are performed pursuant to the first policy for processing reference objects and (b) the second set of garbage collection operations are preformed pursuant to the first policy for processing reference objects;

subsequent to the first set of garbage collection operations and the second set of garbage collection operations:

based, at least in part, on a second level of memory pressure in the memory area, selecting a second policy for processing reference objects;

pursuant to the second policy for processing reference objects, performing a third set of garbage collection operations targeting the first section of the memory area, the third set of garbage collection operations comprising:

identifying a third reference object that holds a third reference to a third referent, the first section of the memory area comprising the third reference object and the third referent, wherein (a) the third reference object is classified as the first type of reference object and (b) the third reference is classified as the second reference type;

based, at least in part, on determining that the third referent is not reachable through a third chain of one or more references of a first reference type, adding the third reference object to a third list of one or more reference objects;

breaking a third set of one or more references of the second reference type that are respectively held by a third set of one or more reference objects comprised within the third list of one or more reference objects, wherein the third set of one or more references comprises the third reference;

pursuant to the second policy for processing reference objects, performing a fourth set of garbage collection operations targeting the second section of the memory area, the fourth set of garbage collection operations comprising:

identifying a fourth reference object that holds a fourth reference to a fourth referent, the first section of the memory area comprising the fourth reference object and the fourth referent, wherein the fourth reference is classified as the second reference type;

based, at least in part, on determining that the fourth referent is not reachable through a fourth chain of references of the first reference type, adding the fourth reference object to a fourth list of one or more reference objects;

breaking a fourth set of one or more references of the second reference type that are respectively held by a fourth set of one or more reference objects comprised within the fourth list of one or more reference objects, wherein the fourth set of one or more references comprises the fourth reference; and updating the first timestamp corresponding to the prior set of garbage collection operations targeting the second section of the memory area, wherein the first timestamp subsequently corresponds to the fourth set of garbage collection operations targeting the second section of the memory area.

5. The one or more non-transitory computer-readable media of claim 1, wherein at least a first subset of the first set of garbage collection operations are performed while a first set of runtime objects comprised within the first section of the memory area are being concurrently manipulated by at least one program thread that is executing a program instance, wherein at least a second subset of the second set of garbage collection operations are performed while a second set of runtime objects comprised within the second section of the memory area are being concurrently manipulated by the at least one program thread that is executing the program instance, wherein at least a third subset of the first set of garbage collection operations are performed at the same time as at least a fourth subset of the second set of garbage collection, wherein the first section of the memory area is a young generation of the memory area, wherein the second section of the memory area is an old generation of the memory area, wherein the first reference is implemented in memory, at least in part, by a first pointer, wherein the first pointer comprises a first address associated with the first referent; wherein the second reference is implemented in memory, at least in part, by a second pointer, wherein the second pointer comprises a second address associated with the second referent.

6. The one or more non-transitory computer-readable media of claim 5, wherein the operations further comprise:

based, at least in part, on determining that the first referent is at least one: (a) linked to a first root object comprised within the first section of the memory area by a first chain of one or more references originating from the first root object or (b) accessible through a first final reference object, storing a first value to a first set of bits comprised within the first pointer; and based, at least in part, on determining that the second referent is at least one: (a) linked to a second root object comprised within the second section of the memory area by a second chain of one or more references originating from the second root object or (b) accessible through a second final reference object, storing a second value to a second set of bits comprised within the second pointer.

7. The one or more non-transitory computer-readable media of claim 6, wherein the first referent is promoted from the first section of the memory area to the second section of the memory area, wherein the first referent is the second referent, wherein the first pointer is the second pointer, and wherein the first set of bits is not the second set of bits.

8. The one or more non-transitory computer-readable media of claim 1, wherein the operations further comprise:

accessing a reference to a runtime object, the memory area comprising the runtime object, wherein the reference is implemented in memory, at least in part, by a pointer comprising a binary address associated with the runtime object;

performing, during the first set of garbage collection operations, at least one of:

responsive to determining that the runtime object is at least one of: (a) linked to a first root object comprised within the first section of the memory area by a first chain of one or more references originating from the first root object or (b) accessible through a first final reference object, storing a first value to a first set of one or more bits comprised within the pointer; or responsive to determining at least one of: (a) that the first chain of one or more references does not comprise a third reference that is classified as the second reference type or (b) the runtime object is accessible through a third chain of one or more references of a first reference type linking the runtime object to the first root object or a third root object comprised within the first section of the memory area, storing a second value to a second set of one or more bits comprised within the pointer; and performing, during the second set of garbage collection operations, at least one of:

responsive to determining that the runtime object is at least one of: (a) accessible through a second chain of one or more references linking the runtime object to a second root object comprised within the second section of the memory area or (b) accessible through a second final reference object, storing a third value to a third set of one or more bits comprised within the pointer; or responsive to determining at least one of: (a) that the second chain of one or more references does not comprise a fourth reference of the second reference type or (b) the runtime object is accessible through a fourth chain of one or more references of the first reference type linking the runtime object to the second root object or a fourth root object comprised within the second section of the memory area, storing a fourth value to a fourth set of one or more bits comprised within the pointer.

9. A method comprising:

performing a first set of garbage collection operations targeting a first section of a memory area, the first set of garbage collection operations comprising:

identifying a first reference object that holds a first reference to a first referent, the first section of the memory area comprising the first reference object and the first referent, wherein the first reference is classified as a second reference type;

based, at least in part, on determining that the first reference object is classified as a first type of reference object, refraining from adding the first reference object to a first list of one or more reference objects;

breaking a first set of one or more references of the second reference type that are respectively held by a first set of one or more reference objects comprised within the first list of one or more reference objects, wherein the first set of one or more references does not comprise the first reference to the first referent;

performing a second set of garbage collection operations targeting a second section of the memory area, the second set of garbage collection operations comprising:

identifying a second reference object that holds a second reference to a second referent, the second section of the memory area comprising the second reference object and the second referent, wherein (a) the second reference object is classified as the first type of reference object and (b) the second reference is classified as the second reference type;

based, at least in part, on at least one of: (a) a first timestamp corresponding to a prior set of garbage collection operations targeting the second section of the memory area or (b) a second timestamp corresponding to the second reference object being used to access the second referent, adding the second reference object to a second list of one or more reference objects;

breaking a second set of one or more references of the second reference type that are respectively held by a second set of one or more reference objects comprised within the second list of one or more reference objects, wherein the second set of one or more references comprises the second reference to the second referent; and updating the first timestamp, wherein the first timestamp subsequently corresponds to the second set of garbage collection operations targeting the second section of the memory area, wherein the method is performed by at least one device including a hardware processor.

10. The method of claim 9, wherein at least a first subset of the first set of garbage collection operations are performed while a first set of runtime objects comprised within the first section of the memory area are being concurrently manipulated by at least one program thread that is executing a program instance, wherein at least a second subset of the second set of garbage collection operations are performed while a second set of runtime objects comprised within the second section of the memory area are being concurrently manipulated by the at least one program thread that is executing the program instance, wherein the first referent is not accessible through a first chain of one or more references of a first reference type, wherein the second referent is not accessible through a second chain of one or more references of the first reference type, wherein the first reference type is a strong reference type, and wherein the second reference type is a non-strong reference type, wherein the first type of reference object is a soft type of reference object.

11. The method of claim 9, further comprising:

prior to breaking the first set of one or more references of the second reference type:

identifying a third reference object that holds a third reference to a third referent, the first section of the memory area comprising the third reference object and the third referent, wherein the third reference is classified as the second reference type;

based, at least in part, on determining that (a) the third reference object is a second type of reference object and (b) the third referent is not reachable through a chain of one or more references of a first reference type, adding the third reference object to the first list of one or more reference objects;

identifying a fifth reference object that holds a fifth reference to a fifth referent, the first section of the memory area comprising the fifth reference object and the fifth referent, wherein (a) the fifth reference is classified as the second reference type and (b) the fifth reference object is classified as the second type of reference object;

based, at least in part, on determining that the fifth referent is strongly reachable through a fifth chain of one or more references of the first reference type, refraining from adding the fifth reference object to the first list of one or more reference objects;

prior to breaking the second set of one or more references of the second reference type:

identifying a fourth reference object that holds a fourth reference to a fourth referent, the second section of the memory area comprising the fourth reference object and the fourth referent, wherein (a) the fourth reference object is classified as the first type of reference object and (b) the fourth reference is classified the second reference type; and based, at least in part, on at least one of: (a) the first timestamp corresponding to the prior set of garbage collection operations targeting the second section of the memory area or (b) a fourth timestamp corresponding to the fourth reference object being used to access the fourth referent, refraining from adding the fourth reference object to the second list of one or more reference objects.

12. The method of claim 9, further comprising:

based, at least in part, on a first level of memory pressure in the memory area, selecting a first policy for processing reference objects, wherein (a) the first set of garbage collection operations are performed pursuant to the first policy for processing reference objects and (b) the second set of garbage collection operations are preformed pursuant to the first policy for processing reference objects;

subsequent to the first set of garbage collection operations and the second set of garbage collection operations:

based, at least in part, on a second level of memory pressure in the memory area, selecting a second policy for processing reference objects;

pursuant to the second policy for processing reference objects, performing a third set of garbage collection operations targeting the first section of the memory area, the third set of garbage collection operations comprising:

identifying a third reference object that holds a third reference to a third referent, the first section of the memory area comprising the third reference object and the third referent, wherein (a) the third reference object is classified as the first type of reference object and (b) the third reference is classified as the second reference type;

based, at least in part, on determining that the third referent is not reachable through a third chain of one or more references of a first reference type, adding the third reference object to a third list of one or more reference objects;

breaking a third set of one or more references of the second reference type that are respectively held by a third set of one or more reference objects comprised within the third list of one or more reference objects, wherein the third set of one or more references comprises the third reference;

pursuant to the second policy for processing reference objects, performing a fourth set of garbage collection operations targeting the second section of the memory area, the fourth set of garbage collection operations comprising:

identifying a fourth reference object that holds a fourth reference to a fourth referent, the first section of the memory area comprising the fourth reference object and the fourth referent, wherein the fourth reference is classified as the second reference type;

based, at least in part, on determining that the fourth referent is not reachable through a fourth chain of references of the first reference type, adding the fourth reference object to a fourth list of one or more reference objects;

breaking a fourth set of one or more references of the second reference type that are respectively held by a fourth set of one or more reference objects comprised within the fourth list of one or more reference objects, wherein the fourth set of one or more references comprises the fourth reference; and updating the first timestamp corresponding to the prior set of garbage collection operations targeting the second section of the memory area, wherein the first timestamp subsequently corresponds to the fourth set of garbage collection operations targeting the second section of the memory area.

13. The method of claim 9, wherein at least a first subset of the first set of garbage collection operations are performed while a first set of runtime objects comprised within the first section of the memory area are being concurrently manipulated by at least one program thread that is executing a program instance, wherein at least a second subset of the second set of garbage collection operations are performed while a second set of runtime objects comprised within the second section of the memory area are being concurrently manipulated by the at least one program thread that is executing the program instance, wherein at least a third subset of the first set of garbage collection operations are performed at the same time as at least a fourth subset of the second set of garbage collection, wherein the first section of the memory area is a young generation of the memory area, wherein the second section of the memory area is an old generation of the memory area, wherein the first reference is implemented in memory, at least in part, by a first pointer, wherein the first pointer comprises a first address associated with the first referent; wherein the second reference is implemented in memory, at least in part, by a second pointer, wherein the second pointer comprises a second address associated with the second referent.

14. The method of claim 13, further comprising:

based, at least in part, on determining that the first referent is at least one: (a) linked to a first root object comprised within the first section of the memory area by a first chain of one or more references originating from the first root object or (b) accessible through a first final reference object, storing a first value to a first set of bits comprised within the first pointer; and based, at least in part, on determining that the second referent is at least one: (a) linked to a second root object comprised within the second section of the memory area by a second chain of one or more references originating from the second root object or (b) accessible through a second final reference object, storing a second value to a second set of bits comprised within the second pointer.

15. The method of claim 14, wherein the first referent is promoted from the first section of the memory area to the second section of the memory area, wherein the first referent is the second referent, wherein the first pointer is the second pointer, and wherein the first set of bits is not the second set of bits.

16. The method of claim 14, further comprising:

accessing a reference to a runtime object, the memory area comprising the runtime object, wherein the reference is implemented in memory, at least in part, by a pointer comprising a binary address associated with the runtime object;

performing, during the first set of garbage collection operations, at least one of:

responsive to determining that the runtime object is at least one of: (a) linked to a first root object comprised within the first section of the memory area by a first chain of one or more references originating from the first root object or (b) accessible through a first final reference object, storing a first value to a first set of one or more bits comprised within the pointer; or responsive to determining at least one of: (a) that the first chain of one or more references does not comprise a third reference that is classified as the second reference type or (b) the runtime object is accessible through a third chain of one or more references of a first reference type linking the runtime object to the first root object or a third root object comprised within the first section of the memory area, storing a second value to a second set of one or more bits comprised within the pointer; and performing, during the second set of garbage collection operations, at least one of:

responsive to determining that the runtime object is at least one of: (a) accessible through a second chain of one or more references linking the runtime object to a second root object comprised within the second section of the memory area or (b) accessible through a second final reference object, storing a third value to a third set of one or more bits comprised within the pointer; or responsive to determining at least one of: (a) that the second chain of one or more references does not comprise a fourth reference of the second reference type or (b) the runtime object is accessible through a fourth chain of one or more references of the first reference type linking the runtime object to the second root object or a fourth root object comprised within the second section of the memory area, storing a fourth value to a fourth set of one or more bits comprised within the pointer.

17. A system comprising:

at least one device including a hardware processor;

the system being configured to perform operations comprising:

performing a first set of garbage collection operations targeting a first section of a memory area, the first set of garbage collection operations comprising:

identifying a first reference object that holds a first reference to a first referent, the first section of the memory area comprising the first reference object and the first referent, wherein the first reference is classified as a second reference type;

based, at least in part, on determining that the first reference object is classified as a first type of reference object, refraining from adding the first reference object to a first list of one or more reference objects;

breaking a first set of one or more references of the second reference type that are respectively held by a first set of one or more reference objects comprised within the first list of one or more reference objects, wherein the first set of one or more references does not comprise the first reference to the first referent;

performing a second set of garbage collection operations targeting a second section of the memory area, the second set of garbage collection operations comprising:

identifying a second reference object that holds a second reference to a second referent, the second section of the memory area comprising the second reference object and the second referent, wherein (a) the second reference object is classified as the first type of reference object and (b) the second reference is classified as the second reference type;

based, at least in part, on at least one of: (a) a first timestamp corresponding to a prior set of garbage collection operations targeting the second section of the memory area or (b) a second timestamp corresponding to the second reference object being used to access the second referent, adding the second reference object to a second list of one or more reference objects;

breaking a second set of one or more references of the second reference type that are respectively held by a second set of one or more reference objects comprised within the second list of one or more reference objects, wherein the second set of one or more references comprises the second reference to the second referent; and updating the first timestamp, wherein the first timestamp subsequently corresponds to the second set of garbage collection operations targeting the second section of the memory area.

18. The system of claim 17, wherein at least a first subset of the first set of garbage collection operations are performed while a first set of runtime objects comprised within the first section of the memory area are being concurrently manipulated by at least one program thread that is executing a program instance, wherein at least a second subset of the second set of garbage collection operations are performed while a second set of runtime objects comprised within the second section of the memory area are being concurrently manipulated by the at least one program thread that is executing the program instance, wherein the first referent is not accessible through a first chain of one or more references of a first reference type, wherein the second referent is not accessible through a second chain of one or more references of the first reference type, wherein the first reference type is a strong reference type, wherein the second reference type is a non-strong reference type, and wherein the first type of reference object is a soft type of reference object.

19. The system of claim 17, wherein the operations further comprise:

prior to breaking the first set of one or more references of the second reference type:

identifying a third reference object that holds a third reference to a third referent, the first section of the memory area comprising the third reference object and the third referent, wherein the third reference is classified as the second reference type;

based, at least in part, on determining that (a) the third reference object is a second type of reference object and (b) the third referent is not reachable through a chain of one or more references of a first reference type, adding the third reference object to the first list of one or more reference objects;

identifying a fifth reference object that holds a fifth reference to a fifth referent, the first section of the memory area comprising the fifth reference object and the fifth referent, wherein (a) the fifth reference is classified as the second reference type and (b) the fifth reference object is classified as the second type of reference object;

based, at least in part, on determining that the fifth referent is strongly reachable through a fifth chain of one or more references of the first reference type, refraining from adding the fifth reference object to the first list of one or more reference objects;

prior to breaking the second set of one or more references of the second reference type:

identifying a fourth reference object that holds a fourth reference to a fourth referent, the second section of the memory area comprising the fourth reference object and the fourth referent, wherein (a) the fourth reference object is classified as the first type of reference object and (b) the fourth reference is classified the second reference type; and based, at least in part, on at least one of: (a) the first timestamp corresponding to the prior set of garbage collection operations targeting the second section of the memory area or (b) a fourth timestamp corresponding to the fourth reference object being used to access the fourth referent, refraining from adding the fourth reference object to the second list of one or more reference objects.

20. The system of claim 17, wherein at least a first subset of the first set of garbage collection operations are performed while a first set of runtime objects comprised within the first section of the memory area are being concurrently manipulated by at least one program thread that is executing a program instance, wherein at least a second subset of the second set of garbage collection operations are performed while a second set of runtime objects comprised within the second section of the memory area are being concurrently manipulated by the at least one program thread that is executing the program instance, wherein at least a third subset of the first set of garbage collection operations are performed at the same time as at least a fourth subset of the second set of garbage collection, wherein the first section of the memory area is a young generation of the memory area, wherein the second section of the memory area is an old generation of the memory area, wherein the first reference is implemented in memory, at least in part, by a first pointer, wherein the first pointer comprises a first address associated with the first referent; wherein the second reference is implemented in memory, at least in part, by a second pointer, wherein the second pointer comprises a second address associated with the second referent.

* * * * *